(12) United States Patent
Sharma et al.

(10) Patent No.: US 10,992,625 B2
(45) Date of Patent: Apr. 27, 2021

(54) UNIFIED MESSAGING PLATFORM

(71) Applicant: Microsoft Technology Licensing, LLC, Redmond, WA (US)

(72) Inventors: Vishal Sharma, Los Altos, CA (US); Elhum Amjadi, Foster City, CA (US)

(*) Notice: Subject to any disclaimer, the term of this patent is extended or adjusted under 35 U.S.C. 154(b) by 21 days.

(21) Appl. No.: 15/279,240

(22) Filed: Sep. 28, 2016

(65) Prior Publication Data

US 2017/0093781 A1 Mar. 30, 2017

Related U.S. Application Data

(60) Provisional application No. 62/233,606, filed on Sep. 28, 2015.

(51) Int. Cl.
*H04L 12/58* (2006.01)
(52) U.S. Cl.
CPC ............ *H04L 51/18* (2013.01); *H04L 51/046* (2013.01); *H04L 51/36* (2013.01)
(58) Field of Classification Search
CPC ........ H04L 51/18; H04L 51/36; H04L 51/046
See application file for complete search history.

(56) References Cited

U.S. PATENT DOCUMENTS

| | | | |
|---|---|---|---|
| 6,529,909 B1 | 3/2003 | Bowman-Amuah |
| 6,549,949 B1 | 4/2003 | Bowman-Amuah |
| 7,155,672 B1 | 12/2006 | Adler et al. |
| 7,353,176 B1 | 4/2008 | Baray et al. |
| 7,739,407 B1 | 6/2010 | Pakkala |

(Continued)

FOREIGN PATENT DOCUMENTS

| | | |
|---|---|---|
| CN | 101431573 A | 5/2009 |
| CN | 102725757 A | 10/2012 |

(Continued)

OTHER PUBLICATIONS

"International Search Report and Written Opinion Issued in PCT Patent Application No. PCT/US2016/054251", dated Dec. 22, 2016, 16 Pages.

(Continued)

*Primary Examiner* — June Y Sison
(74) *Attorney, Agent, or Firm* — Shook, Hardy & Bacon, LLP

(57) ABSTRACT

Techniques for designing a unified messaging platform that functionally integrates an unlimited number of apps by different developers into a single messaging context, allowing users to seamlessly take advantage of external apps' features from within a messaging session. In an aspect, an assistant interface translates between the custom protocol used by a local messaging app and a universal semantic information interchange language (SIIL). The assistant interface communicates using SIIL with an assistant server, which includes a plurality of plugins each dedicated to an external app or "service module" that can interact with the messaging app. In an aspect, the assistant server may include a command inference block incorporating adaptive learning techniques to infer user intent from the messaging session. Further aspects include flexible and robust techniques to enable users to share authority to use external apps with other users, and to revoke such authority, during a messaging session.

23 Claims, 12 Drawing Sheets

(56) References Cited

U.S. PATENT DOCUMENTS

| | | | |
|---|---|---|---|
| 8,495,678 | B2 | 7/2013 | Perlman et al. |
| 8,661,496 | B2 | 2/2014 | Perlman et al. |
| 8,700,006 | B2 | 4/2014 | Ni |
| 8,893,207 | B2 | 11/2014 | Perlman et al. |
| 9,108,107 | B2 | 8/2015 | Perlman et al. |
| 9,111,214 | B1* | 8/2015 | Sharma .................. G06F 3/017 |
| 9,183,560 | B2 | 11/2015 | Abelow |
| 9,225,831 | B2 | 12/2015 | Kim et al. |
| 9,397,861 | B1* | 7/2016 | Tovino .................. H04L 51/24 |
| 9,461,943 | B2 | 10/2016 | Narasimhan et al. |
| 9,661,105 | B2 | 5/2017 | Sharma et al. |
| 9,692,855 | B2 | 6/2017 | Sharma et al. |
| 9,697,202 | B2 | 7/2017 | Sharma et al. |
| 10,353,474 | B2 | 7/2019 | Sharma et al. |
| 2003/0105827 | A1* | 6/2003 | Tan .................. G06Q 10/107 709/206 |
| 2004/0030604 | A1 | 2/2004 | Young |
| 2004/0030640 | A1 | 2/2004 | Mahnken et al. |
| 2004/0104935 | A1 | 6/2004 | Williamson et al. |
| 2004/0260820 | A1* | 12/2004 | Bearman ................ H04L 51/04 709/229 |
| 2005/0027708 | A1 | 2/2005 | Mueller et al. |
| 2007/0237135 | A1* | 10/2007 | Trevallyn-Jones ..... H04L 45/02 370/354 |
| 2007/0288467 | A1 | 12/2007 | Strassner et al. |
| 2008/0201723 | A1 | 8/2008 | Bottaro et al. |
| 2008/0235180 | A1* | 9/2008 | Anand .................. G06F 16/283 |
| 2009/0234638 | A1 | 9/2009 | Ranjan et al. |
| 2009/0254912 | A1 | 10/2009 | Roundtree et al. |
| 2010/0257539 | A1 | 10/2010 | Narayanan et al. |
| 2012/0016678 | A1* | 1/2012 | Gruber .................. G10L 15/22 704/275 |
| 2012/0208564 | A1 | 8/2012 | Clark et al. |
| 2012/0249416 | A1 | 10/2012 | Maciocci et al. |
| 2013/0219459 | A1 | 8/2013 | Bradley |
| 2013/0268260 | A1 | 10/2013 | Lundberg et al. |
| 2013/0321431 | A1 | 12/2013 | Chen et al. |
| 2013/0321441 | A1 | 12/2013 | Pahwa et al. |
| 2013/0321442 | A1 | 12/2013 | Van Os et al. |
| 2013/0321443 | A1 | 12/2013 | Pahwa et al. |
| 2013/0321450 | A1 | 12/2013 | Hultquist et al. |
| 2013/0321456 | A1 | 12/2013 | Hultquist et al. |
| 2013/0321472 | A1 | 12/2013 | Piemonte et al. |
| 2013/0324154 | A1 | 12/2013 | Raghupathy et al. |
| 2014/0028799 | A1 | 1/2014 | Kuffner et al. |
| 2014/0082521 | A1* | 3/2014 | Carolan .................. H04L 51/00 715/752 |
| 2014/0153489 | A1 | 6/2014 | Perras et al. |
| 2014/0162693 | A1 | 6/2014 | Wachter et al. |
| 2014/0164532 | A1 | 6/2014 | Lynch et al. |
| 2014/0214398 | A1 | 7/2014 | Sanders et al. |
| 2014/0269678 | A1 | 9/2014 | Mcgee et al. |
| 2014/0341109 | A1 | 11/2014 | Cartmell et al. |
| 2014/0380182 | A1 | 12/2014 | Lu et al. |
| 2015/0128059 | A1 | 5/2015 | Bakhash |
| 2015/0163102 | A1 | 6/2015 | Staykoff |
| 2015/0165320 | A1 | 6/2015 | Perlman et al. |
| 2015/0213355 | A1* | 7/2015 | Sharma .................. G06F 3/017 706/11 |
| 2015/0278678 | A1 | 10/2015 | Sharma et al. |
| 2015/0278679 | A1 | 10/2015 | Sharma et al. |
| 2015/0370615 | A1 | 12/2015 | Pi-sunyer |
| 2016/0360039 | A1* | 12/2016 | Sanghavi ............ H04M 3/5183 |
| 2017/0093781 | A1 | 3/2017 | Sharma et al. |
| 2017/0262604 | A1 | 9/2017 | Francois |
| 2019/0294255 | A1 | 9/2019 | Sharma et al. |
| 2019/0312979 | A1 | 10/2019 | Sharma |
| 2020/0050967 | A1 | 2/2020 | Lynch |

FOREIGN PATENT DOCUMENTS

| | | |
|---|---|---|
| CN | 102880649 A | 1/2013 |
| CN | 103377276 A | 10/2013 |
| CN | 104506650 A | 4/2015 |
| CN | 104813311 A | 7/2015 |
| EP | 1677218 A2 | 7/2006 |
| WO | 2014197730 A1 | 12/2014 |

OTHER PUBLICATIONS

"Second Written Opinion Issued in PCT Application No. PCT/US2016/054251", dated Jul. 20, 2017, 9 Pages.

"Non Final Office Action Issued in U.S. Appl. No. 14/608,786", dated Mar. 17, 2015, 22 Pages.

"Non-Final Office Action Issued in U.S. Appl. No. 14/738,104", dated Apr. 14, 2016, 21 Pages.

"Non-Final Office Action Issued in U.S. Appl. No. 14/738,121", dated May 2, 2016, 8 Pages.

"Non Final Office Action Issued in U.S. Appl. No. 14/966,212", dated May 27, 2016, 25 Pages.

"Non Final Office Action Issued in U.S. Appl. No. 15/158,718", dated Dec. 9, 2016, 8 Pages.

"Non-Final Office Action Issued in U.S. Appl. No. 15/160,038", dated Nov. 25, 2016, 9 Pages.

"Non-Final Office Action Issued in U.S. Appl. No. 15/173,053", dated Jul. 24, 2017, 31 Pages.

"Non Final Office Action Issued in U.S. Appl. No. 15/279,215", dated May 23, 2018, 11 Pages.

"Non-Final Office Action Issued in U.S. Appl. No. 15/489,741", dated Aug. 31, 2017, 11 Pages.

Valetto, et al., "Using Process Technology to Control and Coordinate Software Adaptation", In IEEE 25th International Conference on Software Engineering, May 28, 2003, 11 Pages.

Sun, et al., "Providing Context-awareness in the Smart Car Environment", In IEEE 10th International Conference on Computer and Information Technology, Jun. 2010, 7 Pages.

"Search Report Issued in European Patent Application No. 15867717.9", dated Jul. 11, 2018, 7 Pages.

Ameiri, et al., "Mobile Arabic Sign Language", In 6th International Conference for Internet Technology and Secured Transactions, Dec. 11, 2011, pp. 363-367.

Burgy, et al., "Zebu: A Language Based Approach for Network Protocol Message Processing", In IEEE Transactions on Software Engineering, vol. 37, Issue 4, Jul. 2011, 17 Pages.

Hays, et al., "Mobile Device to Cloud Co-Processing of ASL Finger Spelling to Text Conversion", In IEEE Western New York Image Processing Workshop, Nov. 22, 2003, pp. 39-43.

Jimenez, et al., "CCENet: Framework for Knowledge Based Collaborative Environments in Internet", In Proceedings of the Advanced International Conference on Telecommunications and International Conference on Internet and Web Applications and Services, Feb. 19, 2006, 6 Pages.

Kim, et al., "On Intelligent Avatar Communication Using Korean, Chinese and Japanese Sign-Languages: An Overview", In 8th International Conference on Control, Automation, Robotics and Vision, Dec. 6, 2004, pp. 747-752.

Lima, et al., "LIBRAS Translator via Web for Mobile Devices", In Proceedings of the 6th Euro American Conference on Telematics and Information Systems, May 23, 2012, pp. 1-4.

Loutas, et al., "Browsing Service Registries using the Atom Interface: An Application in E-Government", In Proceedings of the Third International Conference on Digital Information Management, Nov. 13, 2008, pp. 782-787.

Marsic, Ivan, "Adaptive Collaboration for Wired ADN Wireless Platforms", In IEEE Internet Computing, vol. 5, Issue 4, Jul. 2001, pp. 26-35.

Mulligan, et al., "A Comparison of SOAP and REST Implementations of a Service Based Interaction Independence Middleware Framework,", In IEEE Winter Simulation Conference, Dec. 13, 2009, pp. 1423-1432.

"International Search Report & Written Opinion Issued in PCT Application No. PCT/US2015/065265", dated Mar. 4, 2016, 10 Pages.

"International Preliminary Report on Patentability Issued in PCT Application No. PCT/US2016/054249", dated Dec. 11, 2017, 10 Pages.

(56) References Cited

OTHER PUBLICATIONS

"International Search Report and Written Opinion Issued in PCT Application No. PCT/US2016/054249", dated Dec. 20, 2016, 14 Pages.
"Second Written Opinion Issued in PCT Application No. PCT/US2016/054249", dated Sep. 1, 2017, 9 Pages.
"International Preliminary Report on Patentability Issued in PCT Application No. PCT/US2016/054251", dated Dec. 21, 2017, 18 Pages.
"Office Action Issued in European Patent Application No. 16778979.1", dated Mar. 29, 2019, 9 Pages.
"Office Action Issued in European Patent Application No. 16778979.1", dated Dec. 9, 2019, 9 Pages.
Office Action Issued in European Patent Application No. 16782142.0, dated May 27, 2020, 7 Pages.
"Office Action Issued in European Patent Application No. 16778979.1", dated Aug. 3, 2020, 9 Pages.
"First Office Action Issued and Search Report in Chinese Patent Application No. 201680056135.7", dated Apr. 3, 2020, 18 Pages.
"Non Final Office Action Issued in U.S. Appl. No. 16/437,888", dated Aug. 31, 2020, 8 Pages.
"First Office Action and Search Report Issued in Chinese Patent Application No. 201680055775.6", dated Aug. 26, 2020, 28 Pages.
"Second Office Action Issued in Chinese Patent Application No. 201680056135.7", dated Aug. 24, 2020, 16 Pages.
Comparetti, et al., "Prospex: Protocol Specification Extraction", In Proceedings of IEEE Symposium on Security and Privacy, May 17, 2009, pp. 110-125.

\* cited by examiner

UNIFIED MESSAGING PLATFORM

CROSS-REFERENCE TO RELATED APPLICATIONS

This application claims the benefit of, and incorporates by reference, in its entirety, U.S. Provisional Patent Application No. 62/233,606, filed Sep. 28, 2015.

This application further incorporates by reference, in its entirety, U.S. Pat. No. 9,111,214, "Virtual Assistant System to Remotely Control External Services and Selectively Share Control," to Sharma et al., issued Aug. 18, 2015.

BACKGROUND

Start-of-the-art mobile devices support an increasingly wide array of software applications (or "apps"), including messaging apps, Internet search engines, social networking platforms, online entertainment and shopping tools, etc. Individual apps are typically designed and serviced by different vendors or developers, and limited techniques exist for allowing independent apps to functionally cooperate with each other in a seamless fashion.

For example, when a user engaged in a messaging session desires to retrieve online information relevant to a topic under discussion, the user must typically disengage from the messaging session and open another app to service the query. The same applies when the user desires to perform any other external "non-messaging" tasks from within the context of the messaging session, such as making purchases or retrieving information from a social network.

One way to meet this challenge would be to design messaging apps with ever increasing feature sets, so that more functions (e.g., query, shopping, games, etc.) may be performed from within the messaging session. However, it would greatly exceed the resources of a single entity, e.g., a single software development organization, to design into the messaging app the high level of detail and complexity that is separately found in many of today's software applications.

Accordingly, it would be desirable to provide techniques for designing a unified messaging platform that functionally integrates an unlimited number of independent applications, allowing users to seamlessly take advantage of non-messaging apps' features without needing to disengage from the messaging session. It would further be desirable to provide flexible and robust techniques to enable users to share authority with others to use external services during a messaging session.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards an assistant interface that translates between a custom protocol used by a local messaging app and a universal semantic information interchange language (SIIL). The assistant interface communicates using SIIL with an assistant server, which includes a plurality of plugins each dedicated to an external service that can interact with the messaging app. In an aspect, the assistant server may include a command inference block incorporating advanced adaptive learning techniques to infer user intent from user input to the messaging session. Further aspects include flexible and robust techniques to enable users to share authority with others to use external services during a messaging session.

Other advantages may become apparent from the following detailed description and drawings.

DETAILED DESCRIPTION

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Messaging applications (or "messaging apps") allow users to exchange real-time messages using their computing devices, e.g., smartphones, personal computers, etc. Depending on the messaging application and/or device capability, such messages may incorporate text, images, real-time video, sound, and/or other objects.

Figure 1:
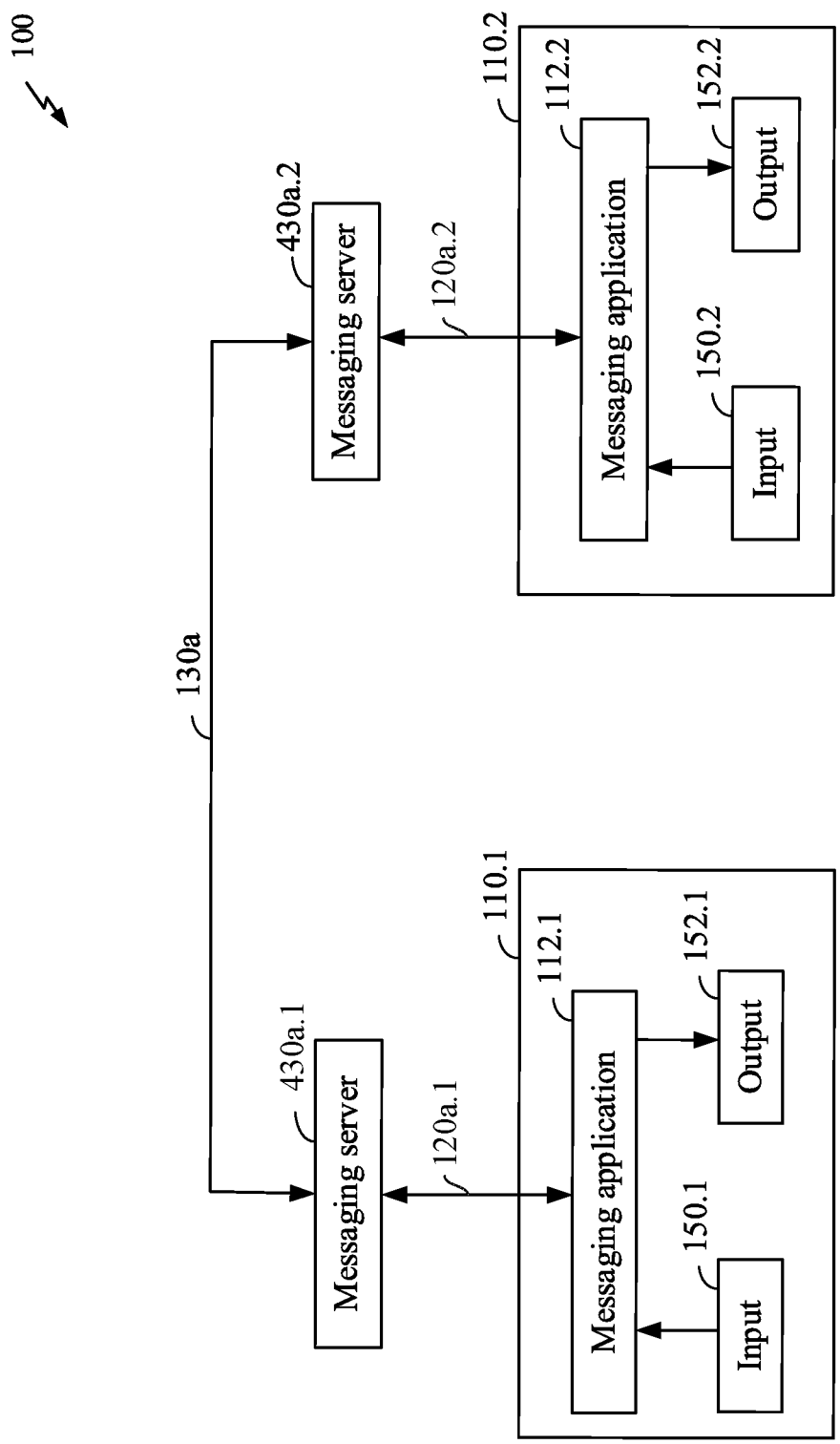
FIG. 1 illustrates an embodiment of a system for implementing a basic messaging application.

FIG. 1 illustrates an embodiment 100 of a system for implementing a basic messaging application. Note FIG. 1 is shown for illustrative purposes only, and is not meant to limit the scope of the present disclosure. For example, it will be appreciated that a system serving two users is shown for illustrative purposes only, and techniques of the present disclosure may readily be modified to accommodate more than two users in any messaging session.

Further note that components functionally corresponding to a first user are generally denoted herein using a "0.1" suffix appended to a numerical designation, while those corresponding to a second user are denoted using a "0.2" suffix, etc. For ease of discussion, reference may be made to numerical elements without the corresponding "0.1" or "0.2" suffix shown in the figures, in which case it will be understood that such reference is meant to denote the corresponding element for either the first user or the second user, as will be clear from the context. For example, a reference to "messaging application 112" in the Specification may denote either "messaging application 112.1" for the first user or "messaging application 112.2" for the second user, e.g., in cases wherein such reference pertains to both the elements.

In FIG. 1, system 100 includes client 110.1 and client 110.2 for serving a first user ("User A") and a second user ("User B"), respectively. Client 110 includes hardware that may be local to and dedicated to each user. For example, input module 150.1 of client 110.1 may receive User A input as text (submitted via a keyboard, voice recognition, or other means, etc.), gestures (as captured by touch screen, cameras, etc.), or other input modalities. Output module 152.2 of client 110.2 may generate for User B imagery or video via a display screen, sounds via an audio speaker, or other effects such as tactile or temperature effects, etc. Client 110 may further include other hardware not explicitly shown, e.g., computational modules, communication modules, etc.

In particular, hardware on client 110 may include computational hardware for implementing a messaging application 112 to locally support messaging interface and processing capabilities, as needed to implement a messaging session such as further described hereinbelow with reference to FIG. 2. For example, messaging application 112 may receive input from input module 150, and also generate output to output module 152. Furthermore, messaging application 112 may communicate over channel 120a with a corresponding messaging server 430a. It will be appreciated that such communication between messaging application 112 and messaging server 430a may generally be conducted using a signaling protocol that is custom, or proprietary, to the developers of the messaging application. Such a "custom protocol" may suit the design needs and specifications of the particular developer of an application, but may not be universally understood by, or openly available to, other "external" software applications and their developers.

It will be appreciated that messaging server 430a.1 for User A may generally be in communication with messaging server 430a.2 for User B over communication channel 130a, to enable the exchange of messages and content between User A, User B, and any other messaging participants not explicitly described herein. In some exemplary embodiments, messaging servers 430a.1, 430a.2 may in fact be considered to be a single server communicating separately with Users A, B over communication channels 120a.1, 120a.2, respectively. In an exemplary embodiment, each channel 120a may correspond to a wired or wireless network connection, e.g., an Internet connection, that serves to connect each client 110 with its respective messaging server.

Figure 2:
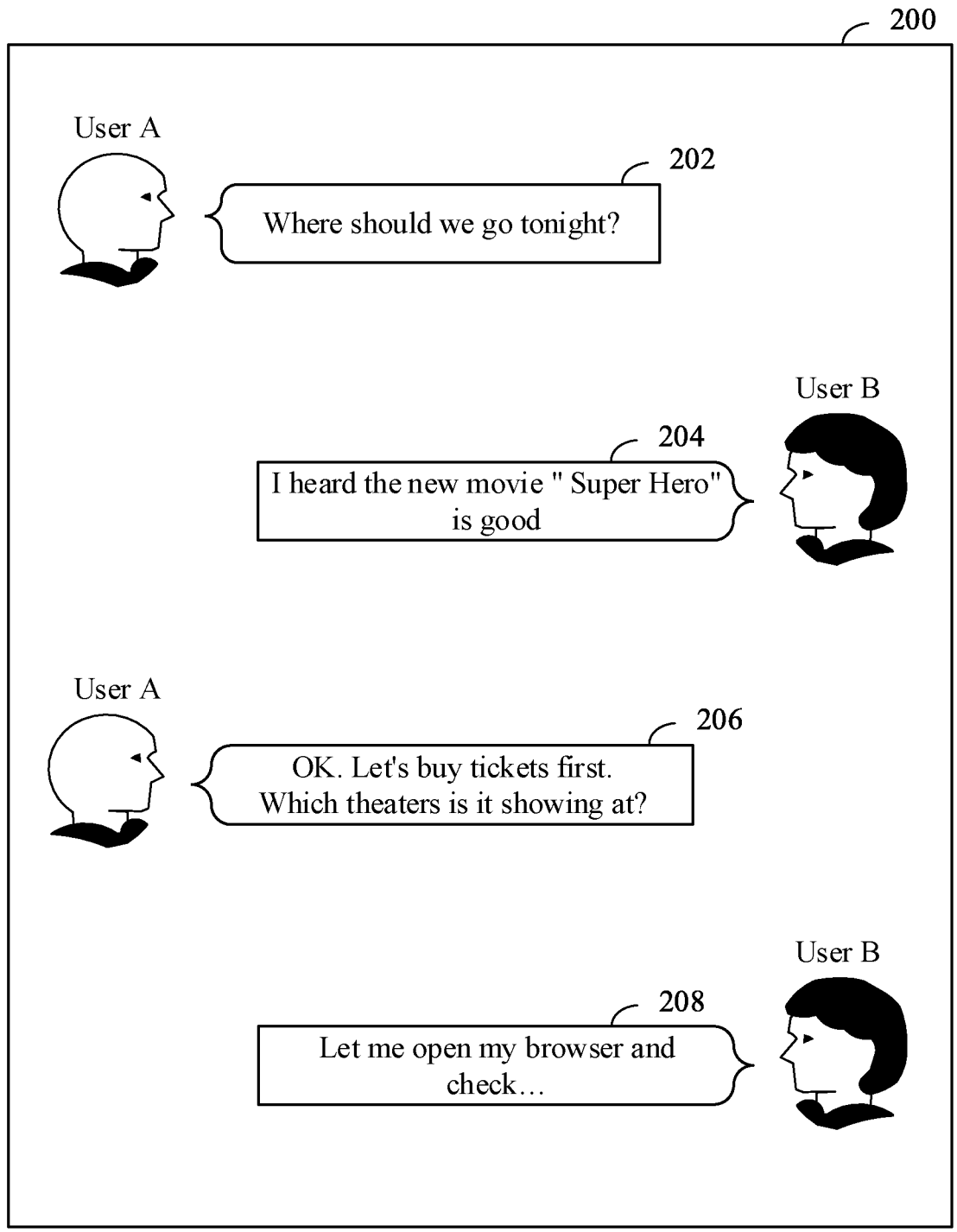
FIG. 2 illustrates a messaging session involving User A and User B in a typical messaging scenario.

FIG. 2 illustrates a messaging session 200 involving User A and User B in a typical messaging scenario. Note FIG. 2 is shown for illustrative purposes only, and is not meant to limit the scope of the present disclosure to any particular types of content or messages exchanged.

In FIG. 2, at Messages 202, 204, Users A and B discuss seeing a specific movie, illustratively entitled "Super Hero." At Message 206, User A asks which theaters are showing the movie under discussion. At Message 208, User B, in response to the query, offers to "manually" search for theaters by switching away from the messaging application to another service application (or "external service"), e.g., a web browser running on the same device. After entering Message 208, User B may momentarily interrupt the messaging session (e.g., switch away from the messaging app), open a browser, type in the movie name ("Super Hero"), look up theaters and show times, then report back to User A using the messaging session, etc.

It will be appreciated that there are several disadvantages with requiring users in a messaging session to perform such a manual routine. First, a user must interrupt the messaging session to open a new application, thereby disrupting the continuity of the conversation. Second, the user must re-type text (e.g., the movie name) that was already entered and discussed in the messaging session. Third, the user must memorize or otherwise copy the retrieved information from the browser back to the messaging session to show the other user.

It would be desirable to provide a unified messaging platform for accommodating other services, that further provides flexible techniques for enabling a variety of tasks and functions to be automatically performed by external services, from within the context of the messaging session.

Figure 3:
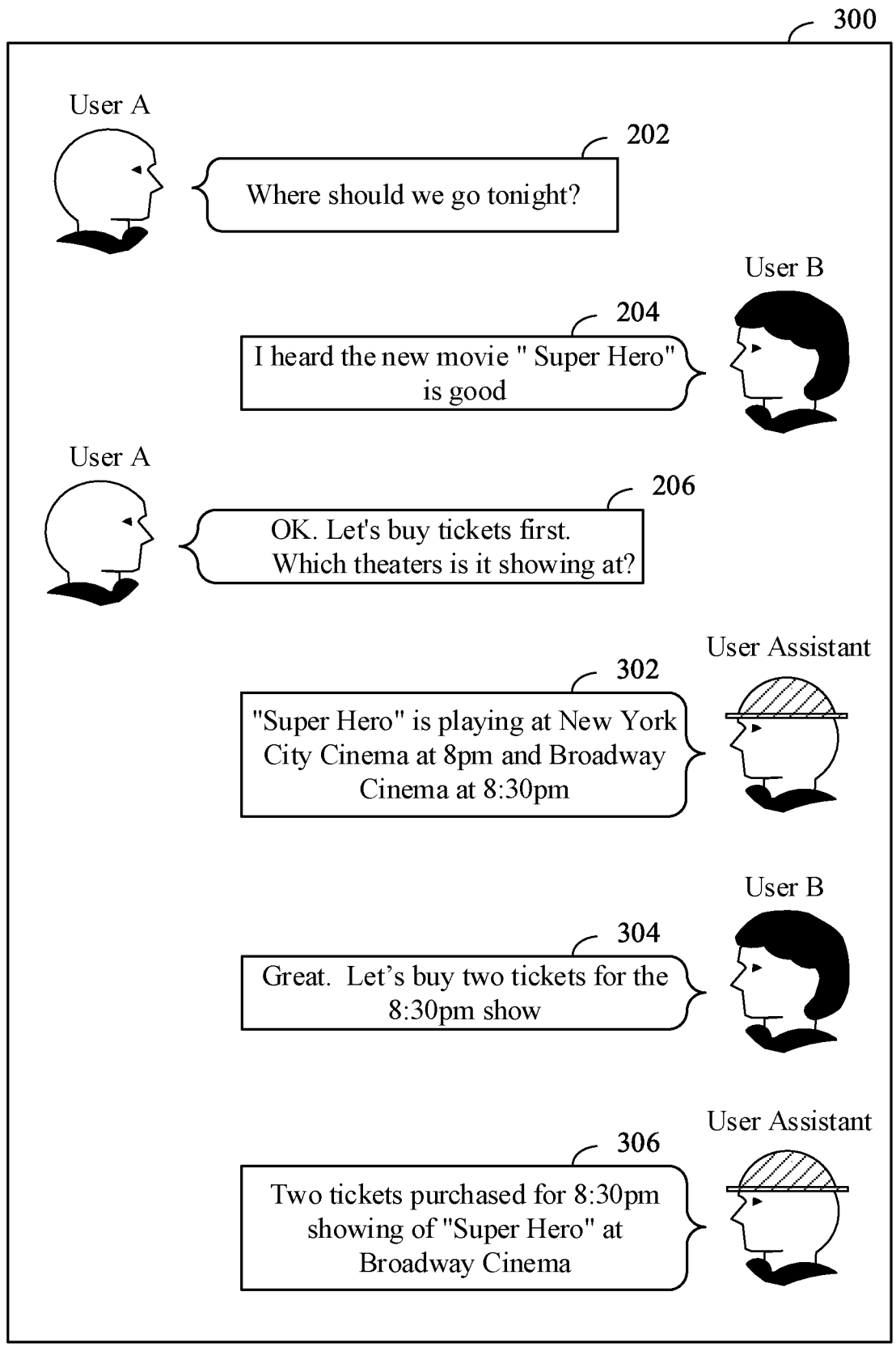
FIG. 3 illustrates an alternative messaging session with Users A and B according to the present disclosure.

FIG. 3 illustrates an alternative messaging session 300 with Users A and B according to the present disclosure. Note FIG. 3 is shown for illustrative purposes only, and is not meant to limit the scope of the present disclosure to any particular types of content or messages, or types of messages or actions that may be automatically generated by a messaging platform according to the present disclosure. Note similarly labeled elements in FIGS. 2 and 3 may correspond to similar functional elements, unless otherwise noted.

In FIG. 3, Messages 202, 204, 206 are reproduced from FIG. 2. However, following Message 206 by User A, asking for which theaters are showing the movie, a new Message 302 is received from a third party denoted "User Assistant." In particular, User Assistant responds to the query posed by User A in Message 206 with relevant information. For example, Message 302 includes names of local theaters showing the movie and show times, responsive to the question by User A at Message 206, and further using information derived from Message 204 by User B (e.g., the movie name "Super Hero").

After Message 302 is displayed, User B at Message 304 then makes a suggestion to buy two tickets for one of the movie showings indicated in Message 302. In response, User Assistant provides an indication at Message 306 that the suggested action has been performed: two tickets for the movie have been purchased, in accordance with User B's instructions at Message 304.

It will be appreciated that User Assistant may, in actuality, correspond to an automated digital assistant configured to monitor the contents of messages exchanged between User A and User B, and to service requests or commands issued by the users according to techniques of the present disclosure. It will further be appreciated that User Assistant may further be configured to recognize and process a broad range of messaging contents, as well as perform a diverse array of tasks by interfacing with any of a plurality of external services, as will be further described hereinbelow, based on techniques of the present disclosure.

Figure 4:
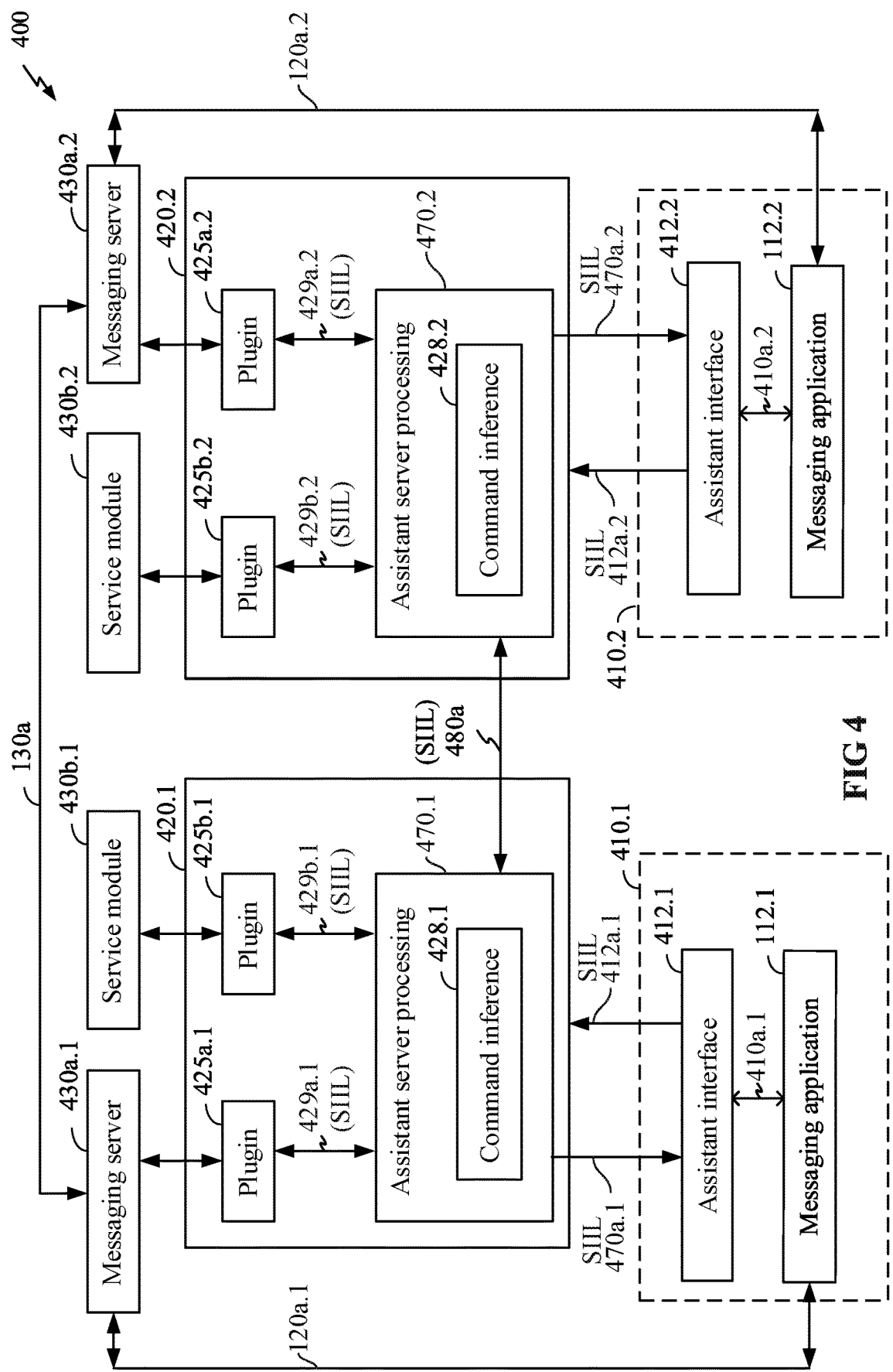
FIG. 4 illustrates an exemplary embodiment of a system for implementing the features described hereinabove with reference to FIG. 3.

FIG. 4 illustrates an exemplary embodiment 400 of a platform for implementing the features described hereinabove with reference to FIG. 3, and other features described in this disclosure. Note similarly labeled elements in FIGS. 1 and 4 may correspond to elements performing similar functionality, unless otherwise noted. Furthermore, certain elements have been omitted from FIG. 4 for ease of illustration, e.g., input modules 150 and output modules 152 from the clients, etc., and it will be appreciated that such elements may be present in any actual implementation. Note FIG. 4 is shown for illustrative purposes only, and is not meant to limit the scope of the present disclosure.

In FIG. 4, client 410 includes an assistant interface 412 coupled through communication channel 410a to messaging application 112. Assistant interface 412 is configured to serve as an intermediary between messaging app 112 and a respective assistant server 420. Assistant server 420 is a server that may include a computer, a dedicated computer (i.e., a back-end server), or a plurality of computers, running one or more programs (e.g., software) that allows communication with assistant interface 412 via channel 412a, which may correspond to, e.g., an Internet connection or other types of connections.

Note while assistant interface 412 is illustratively shown as being part of client 410 in FIG. 4, in alternative exemplary embodiments, assistant interface 412 may instead be implemented with assistant server 420. For example, assistant interface 412 may be logically considered a "plugin" associated with messaging app 112. Such alternative exemplary embodiments are contemplated to be within the scope of the present disclosure.

In particular, assistant interface 412 may provide a "translation functionality" to translate custom protocols used by messaging application 112 (e.g., such as may define signals exchanged over channel 120a) into a universal protocol known as "semantic information interchange language" or "SIIL," also denoted herein a "first protocol." It will be appreciated that this translation effectively standardizes communications between messaging application 112 and the rest of platform 400, including assistant server 420, as well as other service modules and applications besides messaging application 112.

In particular, assistant interface 412 may encode or format the data received from messaging application 112 into one or more standard SIIL messages, e.g., SIIL messages indicating user input or "user-input SIIL messages." For example, a first user-input SIIL message format may correspond solely to textual data, and may specify, e.g., the textual content of a message input by User A in a messaging session. A second user-input SIIL message format may correspond to, e.g., hand gestures, and may specify identifying features of hand gestures such as typical motions (e.g., "swipe," "circle," "repeat swipe," etc.), hand-finger configurations (e.g., "index finger," "thumb," etc.), etc. A third user-input SIIL message format may correspond to, e.g., parameters associated with a predefined "object," such as a movie object or audio file object, as further described hereinbelow. Note the particular types of SIIL message formats are described herein for illustrative purposes only, and are not meant to limit the scope of the present disclosure.

Figure 5:
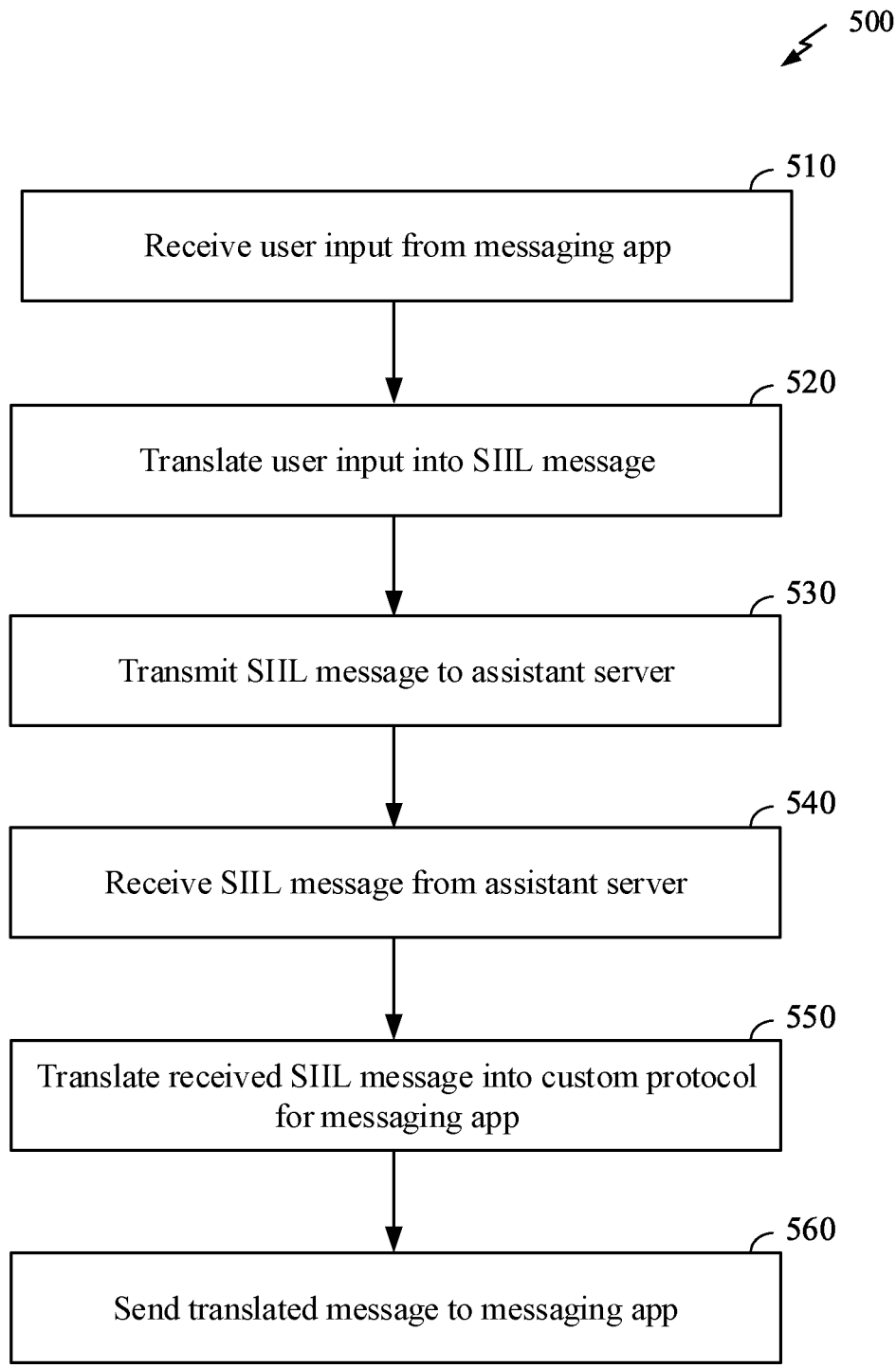
FIG. 5 illustrates an exemplary embodiment of a method performed by the assistant interface according to the present disclosure.

In an exemplary embodiment, assistant interface 412 may provide the user-input SIIL messages to respective assistant server 420 over communication channel 412a. In particular, FIG. 5 illustrates an exemplary embodiment of a method 500 performed by assistant interface 412 of client 410 according to the present disclosure. Note FIG. 5 is provided for illustrative purposes only, and is not meant to limit the scope of the present disclosure.

In FIG. 5, at block 510, user input from a messaging app is received. In an exemplary embodiment, user input may be received at assistant interface 412 from messaging application 112.

At block 520, the user input is translated into SIIL format by assistant interface 412.

At block 530, a user-input SIIL message is transmitted to assistant server 420.

At block 540, an SIIL message, such as an SIIL service message further described hereinbelow, may be received from assistant server 420.

At block 550, the received SIIL message is translated by assistant interface 412 from SIIL into a format compatible with messaging application 112.

At block 560, the translated message is sent to messaging application 112 by assistant interface 420.

Returning to FIG. 4, assistant server 420 includes assistant server processing block 470, and a plurality of plugins 425a, 425b. Each of plugins 425a, 425b enables assistant server 420 to communicate with a respective one of service modules 430a, 430b using channels 429a, 429b, respectively. Note two plugins 425a, 425b corresponding to two service modules 430a, 430b are described with reference to FIG. 4 for illustrative purposes only, and techniques of the present disclosure may generally be applied to accommodate any plurality of plugins and service modules. In this Specification, it will be understood that any reference to "plugins 425a, 425b" or "service modules 430a, 430b" may generally encompass an arbitrary plurality of such plugins or services modules, unless otherwise noted.

In an exemplary embodiment, assistant server 420 may support an open type platform, e.g., a facility whereby any software engineer (also referred to as the software developer) may create plugins 425a, 425b to interface with respective "service modules" 430a, 430b, one of which may include messaging server 430a (which is considered a type of service module, as defined hereinbelow). In particular, a service module is an independent application entity, possibly proprietary to a software organization or company, implementing messaging services and/or external services that may be accessed by the user of a messaging app through the platform described herein. Service modules may implement, e.g., a messaging server such as described with reference to FIG. 1, an online database containing movie records and data, such as show times and theaters, etc., an electronic reservation service for making purchases and/or booking tickets for shows, etc., and any type of digital computer modules that may perform a service for the user.

A plugin (also denoted "plugin module" herein) corresponds to a software connector developed by any software engineer or developer as an interface between an assistant server, which uses SIIL, and any service module, which may communicate using its own custom or proprietary messaging/signaling scheme. In an exemplary embodiment, each plugin 425a, 425b may be configured to automate the translation from SIIL into the custom protocol of a corresponding service module, and vice versa, and thus serve as a translator between SIIL messages (also denoted herein "digital command messages") output by assistant server processing block 470, and the custom protocol used by the respective service module 430a, 430b.

In an exemplary embodiment, assistant server 420 and plugins 425a, 425b may be included together in a single hardware installation, or in multiple hardware installations. Communication between service modules and their respective plugins may be conducted via the Internet, WiFi, WiFi direct, HDMI, USB, FireWire, NFC, Bluetooth, radio frequency identification (RFID), Ethernet, FireWire, universal serial bus (USB), high definition multimedia interface (HDMI), or any other type of wireless or wired connection, etc., or other means. In an exemplary embodiment, assistant server 420 may be integrated with client 410 in a single hardware device.

In alternative exemplary embodiments, plugins 425a, 425b may be directly incorporated into the hardware for implementing respective service modules 430a, 430b. For example, service module 430b may be implemented on one or more computer servers, along with its dedicated plugin 425b, separately from hardware that implements, e.g., assistant server processing block 470. In such alternative exemplary embodiments, communication between a service module and the assistant server may be conducted directly using SIIL messages. Such alternative exemplary embodiments are contemplated to be within the scope of the present disclosure.

Each of service modules 430a, 430b may perform processing responsive to custom messages received from plugins 425a, 425b. For example, message text to be submitted by a digital User Assistant in a messaging session may be generated in assistant server processing block 470.1, and passed on via channel 429a.1 to service module (e.g., messaging server) 430a.1 through plugin 425a.1, causing messaging server 430a.1 to update the messaging session using the received text. In this manner, assistant server 420 may participate in a messaging session between User A and User B, as earlier described with reference to FIG. 3, and generally in any messaging session conducted using any messaging application. Note communications between messaging server 430a and assistant server 420/client 410 may generally be conducted in parallel with routine communications between messaging server 430a and client 410 conducted over channel 120a, earlier described hereinabove with reference to FIG. 1.

In the manner described hereinabove, it will be appreciated that assistant interface 412 and assistant server 420 constitute a "pathway" by which any application residing on client 410, such as messaging application 112 or other applications not explicitly described herein, may communicate directly with one or more service modules 430a, 430b. In an exemplary embodiment, any service module may also utilize this pathway to communicate directly with messaging application 112 through assistant server 420, e.g., bypassing messaging server 430a. For example, service module 430b.1 may implement an online shopping service, which makes a wide range of items available to users for purchase. In this case, User A may utilize the described pathway to retrieve product details from service module 430b.1 during a messaging session, and share such details with other users in the messaging session.

To implement such a pathway, each service module 430a, 430b may be configured to transmit messages to client 410 using their respective plugins 425a, 425b. In particular, a service module 430a, 430b may transmit messages in a custom protocol to its respective plugin 425a, 425b, which may translate such custom messages into SIIL format, encapsulating them in SIIL "service" messages that are then conveyed to assistant server processing block 470. Block 470 may communicate the SIIL service messages back to assistant interface 412 via communication channel 470a. Responsive to receiving the SIIL service messages, assistant interface 412 may generate a corresponding output signal to messaging application 112.

It will be appreciated that, in FIG. 4, separate pathways are shown for processing signals corresponding to User A and User B. For example, a pathway for User A includes assistant interface 412.1, assistant server 420.1, and service modules 430a.1, 430b.1, while a pathway for User B includes assistant interface 412.2, assistant server 420.2, and service modules 430a.2, 430b.2. In certain exemplary embodiments, elements of these separate pathways may be integrated, e.g., a single assistant server 420 (e.g., incorporating functionality of both 420.1 and 420.2 in a single hardware installation) may be connected to multiple clients 410.1, 410.2, etc., at the same time.

Figure 6:
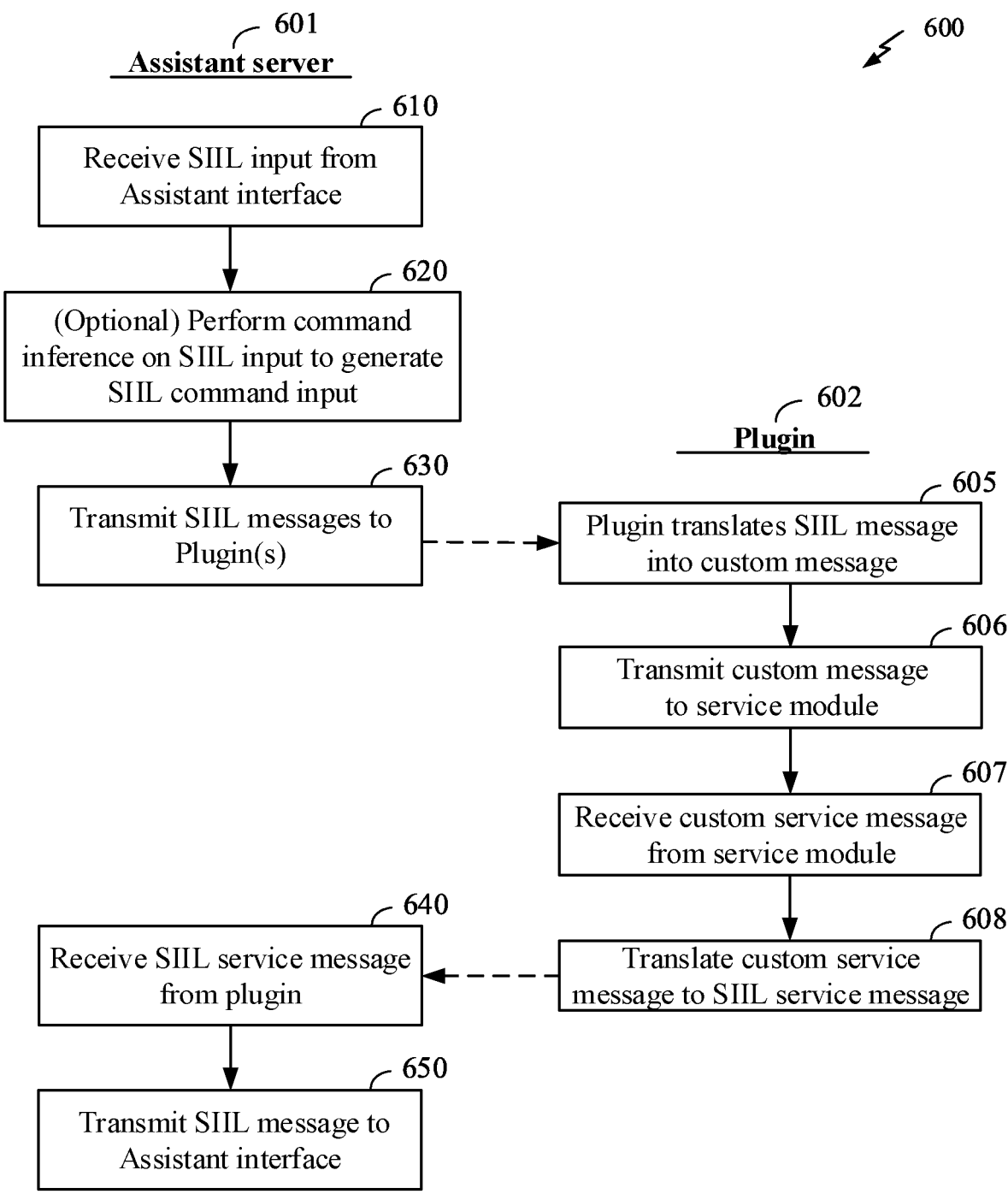
FIG. 6 illustrates an exemplary embodiment of a method performed by an assistant server and plugin according to the present disclosure.

FIG. 6 illustrates an exemplary embodiment 600 of a method performed by an assistant server 420 and plugin 425a or 425b of platform 400 according to the present disclosure. Note in FIG. 6, operations performed by assistant server 420 may be grouped under column 601, while operations performed by plugin 425a or 425b may be grouped under column 602. Further note that operations depicted in FIG. 6 are not meant to suggest that all such operations must be performed in the sequence indicated, e.g., some operations may be performed out of sequence or repeated, while some operations may be omitted, etc. Such alternative exemplary embodiments of the method are understood to be within the scope of the present disclosure.

In FIG. 6, at block 610, SIIL input may be received from assistant interface 412. In an exemplary embodiment, this may correspond to, e.g., user-input SIIL messages being received at assistant server 420 from assistant interface 412.

At block 620, command inference may optionally be performed on the received SIIL input to generate SIIL command input. In an exemplary embodiment, such command inference may be performed as described hereinbelow with reference to FIG. 7. In an alternative exemplary embodiment, command inference may be bypassed, and a user-input SIIL message may be directly passed on to a respective plugin.

At block 630, SIIL messages are transmitted to one or more plugins 425a, 425b. In an exemplary embodiment, such SIIL messages may include, e.g., user-input SIIL messages or command-input SIIL messages, if available, or other types of SIIL messages.

Block 605 illustrates an exemplary operation that may be performed by a plugin responsive to block 630 being performed by assistant server 420. At block 605, the plugin translates the SIIL message into a custom protocol message for a respective service module.

At block 606, the custom message is transmitted to the service module.

At block 607, a custom service message is received from the service module, e.g., in the custom protocol.

At block 608, the custom service message is translated into SIIL protocol, and the SIIL service message is transmitted to assistant server 420.

Block 640 illustrates an exemplary operation that may be performed by the assistant server responsive to block 608 being performed by the plugin. At block 640, the SIIL service message is received from the plugin.

At block 650, the SIIL service message is transmitted to assistant interface 412.

As discussed hereinabove, in some exemplary embodiments, assistant server processing block 470 may include an optional command inference block 428. In particular, signals received from assistant interface 412 at assistant server processing block 470 may already be encoded as user-input SIIL messages by assistant interface 412. In some cases, however, assistant server 420 may accommodate further intelligent processing to generate command-input SIIL messages that infer the user-intended meanings of the user-input SIIL messages.

Figure 7:
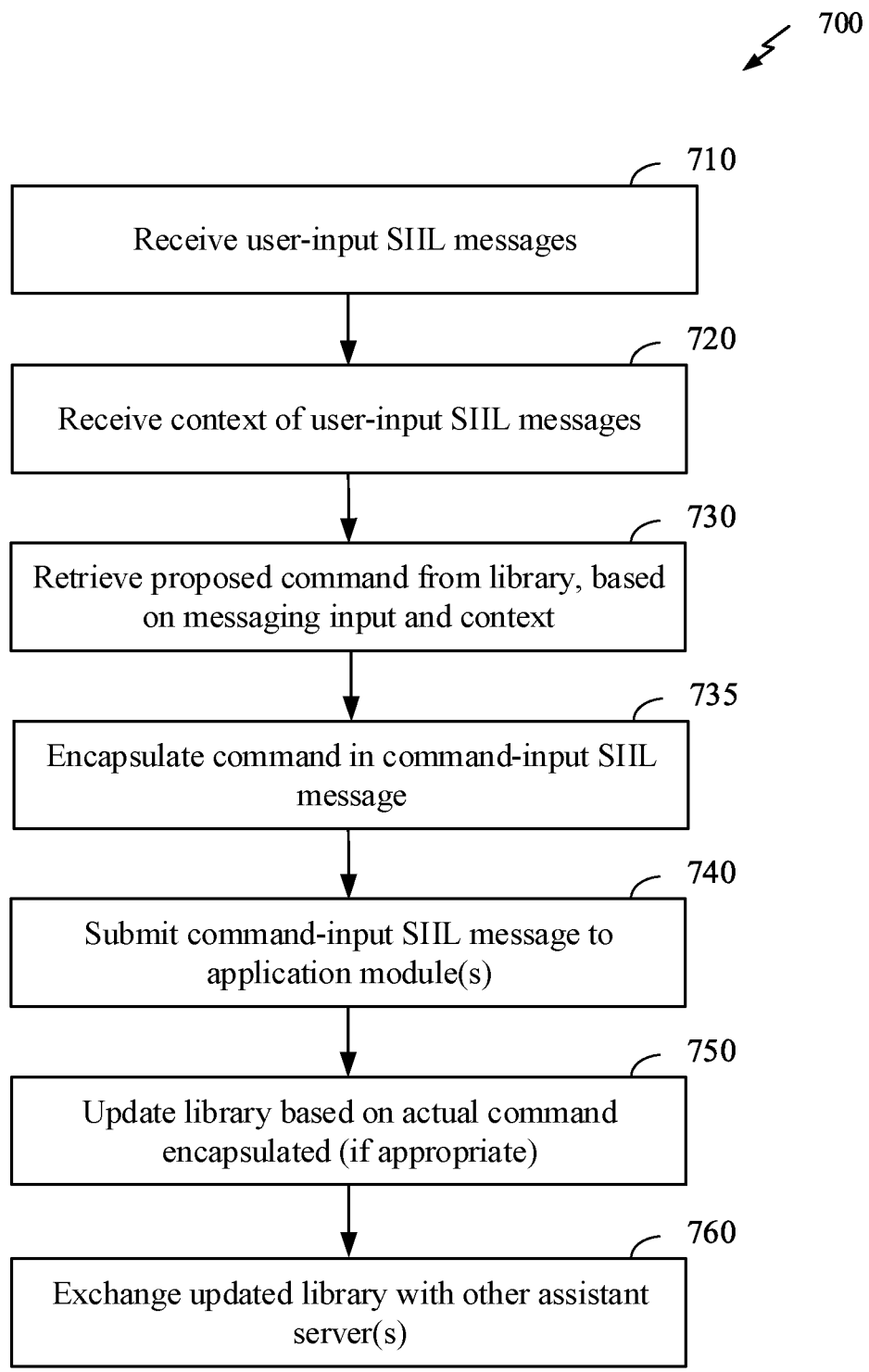
FIG. 7 illustrates an exemplary embodiment of operations performed by the command inference block of the assistant server processing block.

FIG. 7 illustrates an exemplary embodiment of operations performed by command inference block 428 of assistant server processing block 470. Note FIG. 7 is shown for illustrative purposes only, and is not meant to limit the scope of the present disclosure to any particular implementation of command inference block 428.

In FIG. 7, at block 710, command inference block 428 receives user-input SIIL messages from the corresponding client(s). In an exemplary embodiment, user-input SIIL messages may be received from a client for a single user, e.g., via inputs from an input module of a client. In an alternative exemplary embodiment, user-input SIIL messages may also be received from other user(s), e.g., via a communication channel 480a shown in FIG. 4 from a command inference block 428 of another assistant server 420. In this manner, any assistant server 420 may recognize "multi-user" commands that are composed of inputs from multiple users. In an exemplary embodiment, channel 480a may correspond to, e.g., a wired or wireless network connection, a local area network (LAN) type connection, etc.

At block 720, the context of the user-input SIIL messages received at block 710 is also received. In particular, the meaning of user inputs may vary depending on the context in which they are received. In this Specification and in the Claims, "context" may refer to the specific user or overall system configuration or situation that forms the background from which a particular user input arises. For example, context may denote the user's geographic location when generating the input, the identity of other users in a messaging session, a time of day when the user input is made, prior user inputs, or any other details accompanying a particular user input, etc.

The same inputs may also be interpreted differently for different users. For example, if one user consistently enters certain message text to execute a first command and another person enters the same message text to execute a second command, block 428 may learn to identify these preferences based on taking the user identity as the context. Note that this use of adaptive learning to interpret user inputs differently for different users also permits the emergence of "dialects" of input commands among different user groups, or amongst individuals.

At block 730, based on the user-input SIIL messages received at block 710 and corresponding context received at block 720, command inference block 428 retrieves a proposed command from a stored digital library of input/context-to-command mappings. In particular, the stored digital library may correspond to a memory (not shown) in assistant server 420 which stores candidate commands corresponding to distinct combinations of user inputs and context.

For example, a specific user-input SIIL message may include text entered during a messaging session such as "I wonder what theaters the movie 'Super Hero' is showing at," along with the context of the user's physical location (e.g., New York City) and time of day (e.g., 6 pm). In an exemplary embodiment, this combination of user input and context may be mapped by block 428, using the stored library, into a proposed command of "search for theaters showing 'Super Hero' in New York City today after 6 pm" to be sent to an Internet search engine (which may be implemented by, e.g., service module 430b). Note this mapping is described for illustrative purposes only, and is not meant to limit the scope of the present disclosure to any particular mappings between input/context and commands.

At block 735, a command is encapsulated as a command-input SIIL message. In an exemplary embodiment, the proposed command retrieved at block 730 may correspond to the actual command encapsulated at block 735. In an alternative exemplary embodiment, the proposed command retrieved at block 730 need not be the actual command encapsulated at block 735. In particular, various techniques may be employed to refine the proposed command based on other factors, e.g., corrections as applied by the user, or by other users, etc.

For example, if a user enters a query during a messaging session that is not recognized or is incorrectly interpreted by block 428, the user can reject the proposed command, and instead explicitly enter commands to be executed through a graphical interface, e.g., a display of selectable icons, or some other predetermined entry formula, e.g., entering text in a search query toolbar or selection of a menu item from a menu offered by the messaging application. In this manner, the difference between proposed and executed commands can be incorporated to enable block 428 to adapt and learn the appropriate commands to associated with the unrecognized or misinterpreted user inputs.

Furthermore, in a messaging session between two or more users, one user may make a user input that can then be corrected or complemented by another user. For example, one user might continually refer to an acquaintance named "Bobby" as "Robby" by mistake in a messaging session. In this case, command inference block 428 may fail to recognize, or propose the wrong command based on the mistakenly entered name. In this case, a second user might note the incorrect reference to "Robby" by the first user, and supply the correct name of "Bobby" in the messaging session. For example, the second user might enter text in the messaging session such as "You mean Bobby, right?" In response to the correction by the other user, command inference block 428 could be enabled to automatically update its library of input/context-to-command mappings to reflect "Bobby" whenever the first user types "Robby" in the future. Thus in this case, the second user refines the proposed command into an actual command.

At block 740, the command-input SIIL message encapsulating the proposed command is submitted to one or more service modules.

At block 750, if appropriate, a library accessed by translation block 428 may be updated based on the actual command encapsulated at block 735. In particular, referring to the scenario described hereinabove, wherein a second user corrects the incorrect reference to "Robbie" by the first user, translation block 428 in communication with the first user may then update its library to associate the original, unrecognized reference to the correct reference. This updating of the library is an example of adaptive learning, which enables the assistant server to adaptively expand its vocabulary of user inputs.

At block 760, updates to the library at block 750 may be exchanged with other assistant servers. In particular, the updating of the library by an assistant server can be extended to other instances of the assistant server, e.g., corresponding to other sub-systems. Different instances of the assistant server may thus communicate to each other the adaptively learned mappings between user inputs and command inputs to update their respective libraries.

In an exemplary embodiment, at blocks 710-730, multiple messaging session inputs from one or more users can be bundled together to generate a single set of commands, e.g., using channel 480a amongst multiple users. In particular, "multi-user" inputs executed by multiple users may similarly be bundled into a single composite user input to trigger an entire set of commands. For example, if User A enters some text input, followed by User B entering some text input, followed by User C entering some text input, and these users often perform these actions in conjunction, then all of these text inputs can be bundled together into a single composite text input to trigger the sequence of commands that would otherwise be triggered if each text input was separately performed by each user every time. For example, referring to messaging session 300 described hereinabove, Messages 204 and 206 may be bundled to generate a single query that incorporates both information from Message 206 by User A (e.g., "which theater") and Message 204 (e.g., movie name is "Super Hero").

Alternatively, if a set of commands is repeatedly executed as the result of a corresponding set of messaging inputs by a user (e.g., suggestions about movies and theaters frequently are followed by purchase of tickets), translation block 428 may predictively bundle the set of messaging inputs, the execution of which triggers a fixed set of command inputs (e.g., search for theaters showing the movie, and purchase tickets to the movie).

In some cases, command inference block 428 will store mappings between user inputs and command inputs that correspond to subconscious user behavior. For example, if the user consistently enters certain text in certain contexts, e.g., messages a certain friend at a certain time of day, then such actions may be learned by command inference block 428, which may learn to predictively issue certain commands in anticipation of the user behavior, even when the user himself or herself is not consciously aware of such behavior.

Figure 8:
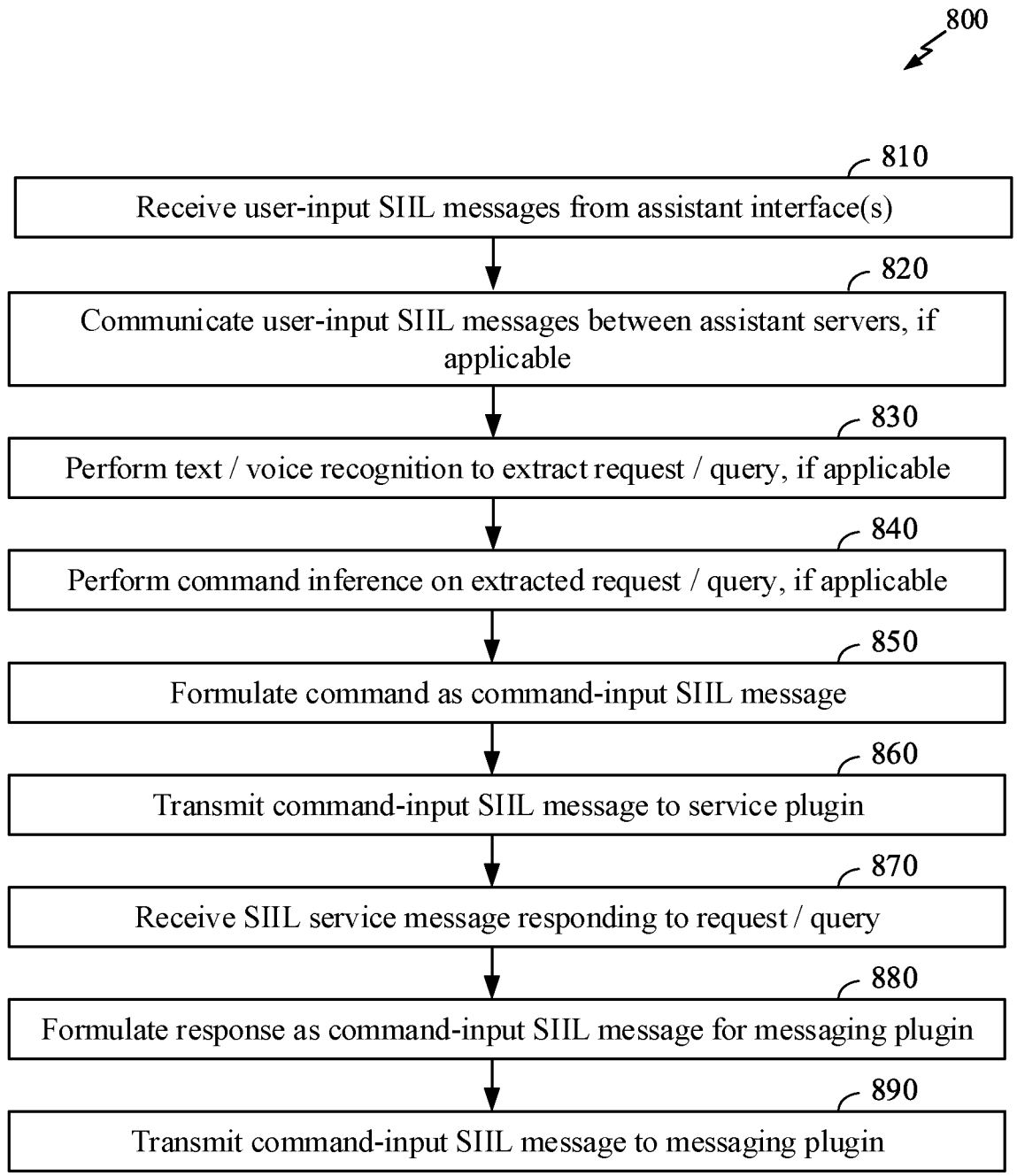
FIG. 8 illustrates an exemplary embodiment of a method utilizing system for implementing a messaging scenario such as described with reference to the messaging session of FIG. 3.

FIG. 8 illustrates an exemplary embodiment of a method 800 utilizing platform 400 for implementing a messaging scenario such as described with reference to messaging session 300. The operations described in FIG. 8 may generally be performed by one or more assistant servers, working separately or in tandem. Note FIG. 8 is shown for illustrative purposes only, and is not meant to limit the scope of the present disclosure.

At block 810, user-input SIIL messages are received from assistant interface(s). In an exemplary embodiment, assistant server 420.1 may receive user-input SIIL messages from assistant interface 412.1. Similarly, assistant server 420.2 may receive user-input SIIL messages from assistant interface 412.2. In an exemplary embodiment wherein a single assistant server serves multiple users, one assistant server may receive user-input SIIL messages from multiple assistant interfaces.

In an exemplary embodiment, with reference to messaging session 300 of FIG. 3, user-input SIIL messages may corresponding to messaging text (e.g., Messages 202, 204, 206) input by User A and User B.

At block 820, the received user-input SIIL messages may be communicated between assistant servers, if applicable. In an exemplary embodiment, such communication may be performed over, e.g., communication channel 480a as shown in FIG. 4. In an alternative exemplary embodiment wherein a single server processes multiple inputs from multiple assistant interfaces, such communication need not be performed. In alternative exemplary embodiments, user-input SIIL messages need not directly be exchanged amongst assistant servers. Rather, assistant servers may exchange the outputs of command inference or other post-processed versions of user-input SIIL messages, e.g., as described hereinbelow with reference to blocks 830-850 below. Such alternative exemplary embodiments are contemplated to be within the scope of the present disclosure.

At block 830, text or voice recognition or other types of input classification schemes may be performed on user input as determined from user-input SIIL messages, if applicable. The operations performed at this block may result in extraction of a request or query from the exchanged user-input SIIL messages. For example, user input text corresponding to "let's see 'super hero' tonight" and user input text corresponding to "which theater?" may be processed at block 830 to extract a relevant query of "which theaters is the movie 'super hero' showing at tonight?"

In an exemplary embodiment, machine learning and/or artificial intelligence techniques may be applied to extract recognized requests or query from interpreted commands At block 840, command inference may be performed by command inference blocks, if applicable. In an exemplary embodiment, operations described with reference to command inference block 428 in FIG. 7 hereinabove may be performed.

At block 850, a command is formulated as one or more command-input SIIL messages. In an exemplary embodiment, this may correspond to operations performed at, e.g., block 735 of FIG. 7 described hereinabove.

At block 860, command-input SIIL messages are transmitted to an appropriate plugin. With reference to messaging session 300, operations performed may correspond to transmitting the query "which theaters is the movie 'super hero' showing at tonight?" (e.g., as formulated at blocks 840-850) to a plugin for an online query engine that provides such information. For example, a plugin for a Web search engine such as Bing may be optimized to handle such queries and retrieve relevant information.

At block 870, SIIL service messages are received that respond to the request or query transmitted. For example, theaters and show times for the requested movie in messaging session 300 may be received from the Web search engine plugin.

At block 880, the received response is formulated as a command-input SIIL message for the messaging plugin. For example, the retrieved theaters and show times at block 870 may be formatted as a command-input SIIL message of "send text message" containing the parameters of the retrieved movie showing.

At block 890, the formulated command-input SIIL message is transmitted to messaging plugin 425a for messaging server 430a. In this manner, messaging server 430a may update messaging session 300 to show Message 302.

It will be appreciated that, using the platform described hereinabove, communication between service modules and assistant server(s) is standardized using SIIL, and translation functionality may be provided at the assistant server and assistant interface. Thus plugin developers may generally define one or more given actions for a plugin in the semantic information interchange format language, without being required to access the custom protocol used by messaging application, which may in any case vary across different messaging applications. Similarly, messaging application developers may design the messaging app to allow access to an unlimited range of external services, without needing to develop software written in the custom protocols of those external services.

It will be appreciated that platform 400 and method 800 may readily be adapted to accommodate other aspects of messaging sessions described hereinabove. For example, the feature indicated at Message 306 of messaging session 300, i.e., automatically purchasing tickets from within a messaging session, may also be implemented based on operations described with reference to method 800 of FIG. 8.

In particular, at block 830, User B's request to buy two tickets for the 8:30 show is extracted from Message 304, as well as previously exchanged messages containing the movie title, theater, etc. At block 840, command inference is performed to infer the desire to purchase two tickets for a given showing at a given movie theater. At block 850, the inferred command is formulated as a command-input SIIL message directed to a specific plugin, e.g., corresponding to an online movie ticket purchase application. In particular, a command-input SIIL message such as "purchase two tickets for 8:30 showing of 'Super Hero' at Broadway Cinema" may be formulated. At block 860, the command-input SIIL message may be transmitted to the respective plugin. At block 870, confirmation that the tickets have been purchased is received as an SIIL service message. At block 880, a message having contents corresponding to Message 306 is formulated as a command-input SIIL message, e.g., of "send text message." At block 890, the formulated command-input SIIL message is transmitted to messaging plugin 425a for messaging server 430a.

Techniques of the present disclosure may further accommodate alternative exemplary embodiments wherein a User Assistant, e.g., as described hereinabove with reference to FIG. 3, need not be present. In particular, in such exemplary embodiments, a user of a messaging application may access external services directly, using interface buttons, menu items, or other icons provided in the interface of the messaging application.

For example, in an exemplary embodiment of a "direct link" feature of the present disclosure, messaging application 112 may itself be configured to allow direct user input to assistant interface 412. In particular, instead of requiring assistant server 420 and assistant interface 412 to continuously and unobtrusively monitor the conversation between User A and User B as described in FIG. 3, messaging application 112 may contain a button or menu in its messaging interface that allows any user to explicitly issue queries or make requests to external service modules supported by the platform.

For example, rather than having the system infer an intent to search for movie times and/or purchase tickets, messaging application 112 may provide a "movies" button on its user interface. Upon clicking such a button, users may directly input queries about movie theaters and show times. To implement this feature, queries may be provided directly to assistant interface 412, which performs conversion to SIIL messages and transmits to assistant server 420 and the appropriate plugin, etc., in the same manner as previously described hereinabove for the "automated" exemplary embodiments, e.g., method 800 of FIG. 8.

Figure 9:
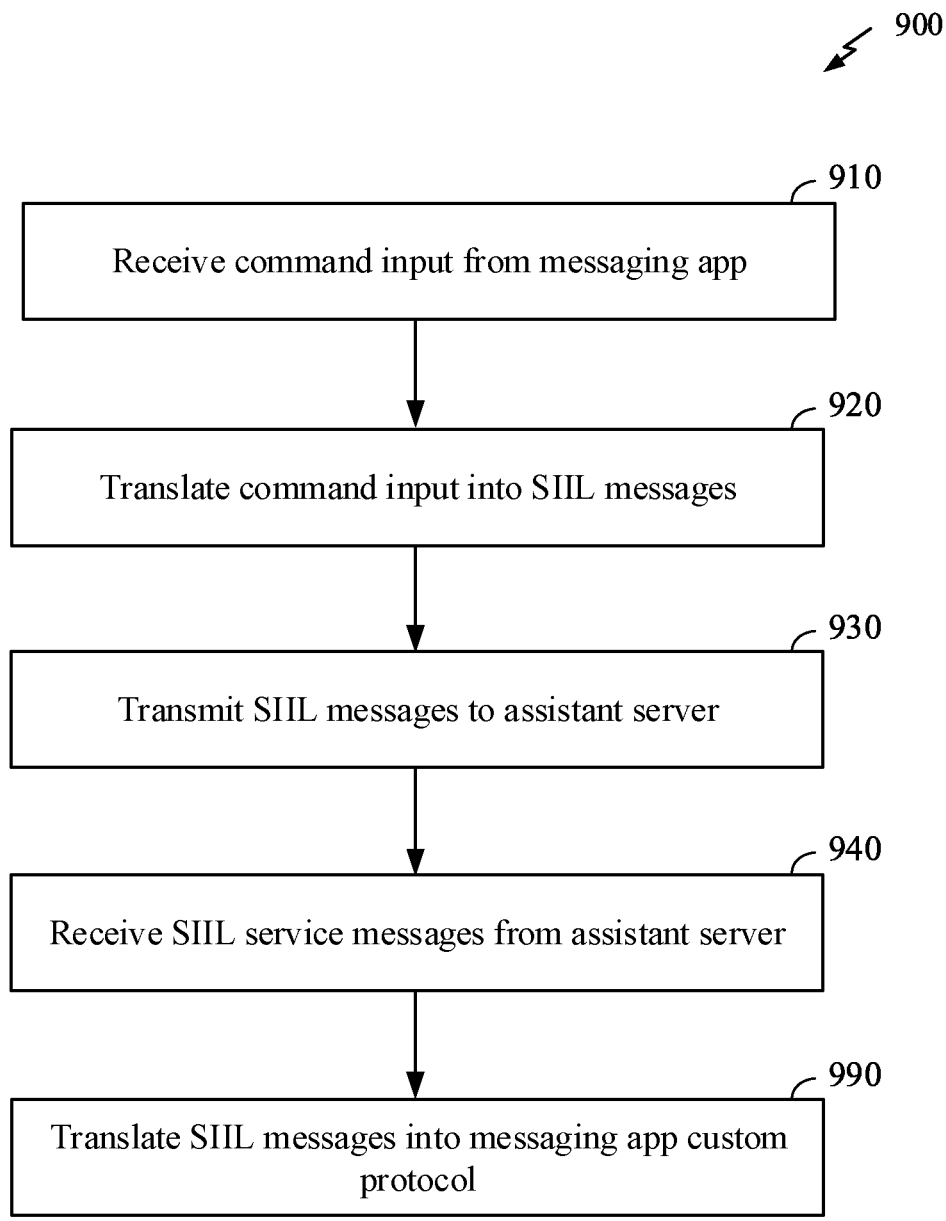
FIG. 9 illustrates an exemplary embodiment of a method for implementing direct link functionality according to the present disclosure.

FIG. 9 illustrates an exemplary embodiment 900 of a method for implementing direct link functionality according to the present disclosure. Note FIG. 9 is shown for illustrative purposes only, and is not meant to limit the scope of the present disclosure.

In FIG. 9, at block 910, command input is received from the messaging app. In an exemplary embodiment, messaging app 112 may be configured to contain a direct link to assistant interface 412, whereby a user may directly enter command inputs from messaging app 112 to assistant interface 412.

At block 920, the received command input is translated into SIIL messages. In an exemplary embodiment, assistant interface 412 may perform translation from custom protocol command-input messages of the messaging server, into corresponding SIIL messages.

In an exemplary embodiment, assistant interface 412 may be directly incorporated into messaging app 112, in which case blocks 910 and 920 may be performed directly by messaging app 112.

At block 930, SIIL messages are transmitted to the assistant server.

At block 940, SIIL service messages are received from the assistant server, e.g., in response to block 930.

At block 950, SIIL messages are translated into the custom protocol of the messaging app, so that they can be displayed to the user via the interface of the messaging app.

It will be appreciated that in exemplary embodiments of the present disclosure wherein direct link functionality is provided, assistant server 420 need not maintain an active connection to messaging server 430a through plugin 425a. Furthermore, command inference block 428 may be bypassed. Such alternative exemplary embodiments are contemplated to be within the scope of the present disclosure.

In an exemplary embodiment, the platform described herein may be utilized to, e.g., enable the sharing and revocation of authority amongst users as further described hereinbelow. For example, the messaging application 112 may be configured to provide a "share/revoke authority" menu or button in its messaging interface, wherein a user can select a menu item or enter text, etc., to signal to the system that authority is to be shared with other users in the messaging session. Alternatively, a user may enter express such a desire to share or revoke authority by typing a message in the messaging session, and such command may then be processed using, e.g., the operations described with reference to method 800 of FIG. 8.

In response to user input to share or revoke authority, assistant interface 412 and assistant server 420 may dispatch the appropriate SIIL messages to plugins corresponding to service modules providing the services to be shared or revoked. It will be appreciated that, as assistant servers may generally be in communication with each other, e.g., over channel 480a as described hereinabove, the described techniques allow extension and revocation of authority to other users, possibly connected to different assistant servers.

In an exemplary embodiment, techniques of the present disclosure may be applied to enable sharing of authority amongst users in a messaging session. For example, a user in a messaging session may have authorization to issue commands to a specific service module, e.g., make purchases on a shopping website, while other users in the messaging session do not have such authorization. In this case, the user may choose to share his or her authorization with other users. For example, the user may issue a command input to the messaging app to extend authority to a specified service module to one or more other users in a messaging session. Assistant server 470 may process the command input as an SIIL message, and communicate the sharing of authority with an assistant server serving the other user(s) to which the authorization is to be extended. These users sharing in the authority would have some or all of the rights of access to the relevant service. Notably, sharing access need not entail sharing passwords or other user credentials. As such, a user's credentials remain secure and the ultimate authority of the rights to control such services remain with the user that chooses to share the authority with other users. Sharing authority may also be for a limited time, or based on a context, e.g., the other user only has access while within a geo-fenced area. This sharing of authority is also described in detail in U.S. Pat. No. 9,111,214.

In an exemplary embodiment, the messaging session itself may be a context for sharing authority. For example, a user in a messaging session can indicate to assistant interface 412 that such user is extending control over something to one or more other users of the messaging session. This control could be temporary, permanent, or revocable upon user instruction or upon a certain context, e.g., upon the completion of a messaging session. For example, two users in a group chat session may desire to play a game of chess, using a service that only one of the users has access rights to. The user with access rights could extend those access rights to the other user for the duration of the chat session, so that both users would have access rights to use the chess service during the chat session. As another example, a user can add a webcam view into a chat session which is only operational as long as the chat session lasts. This webcam view may not be directly related to the participants in the chat session, e.g., it may be a view different from that of a conventional video conference session. For example, the webcam view may be a view from a movable webcam focused outward on a physical space that can then be manipulated by the users in the chat session to swivel or zoom. The owner of this webcam may extend authority to the other users in the chat session to control the webcam, e.g., by viewing the output and manipulating the view, without being required to also share access criteria, such as, for example, usernames and passwords.

Joint authority can also operate in these situations. For example, there could be an action that requires two different users to extend their authority. In this case, a concurrent extension of authority can also be made. That is, users can share their respective authority with each other, so that the users are all granted the sum total of the authority. This scenario may be referred to as "pooled authority."

A messaging session can further be a context used to limit the extension of authority. For example, a presentation might be made available by a user to other users of a messaging session only as long as that messaging session lasts. Similarly, a user might be able to view a camera in a chat session with another user (or set of users) but not be able to view the camera anywhere else. Or the users may be able to view a presentation that has been shared in messaging when those users are messaging with the owner-user, but not at another time without the owner-user. Similarly, there may be services (for example songs or movies) that two or more users can use together inside a messaging session when one user is authorized, i.e., when one user has authority over the services, but have access to those services be denied to un-authorized users when such users are not accompanied by an authorized user. As another example of contextual extension of authority, a user may share authority for one or more services with members of a chat group as long as the user is a member of the chat group. If that authorized user leaves the chat group, any authority extended by that user to the other users in the chat for the one or more services may automatically lapse. This contextual extension of authority allows multiple users to pool authority. For example, a group of users may pool authority for a list of movies that the users individually have access to via a movie service. When a user leaves that group, that user's authorized movies would no longer be accessible by the other users in the group.

Contextual extension and revocation of authority may also be driven by the content of the messaging session itself. If the system is managing a messaging session, the client device could also be monitoring the content of the messaging for relevant command inputs, which may be forwarded to the assistant server to carry out the associated actions. For example, a user in a messaging session might ask permission from another user to use a service, e.g., "can I use the dropcam?", and this question could be translated into the semantic information interchange format language by the client device and sent to the assistant server. The assistant server could interpret this statement as a request to share access to the relevant service, in this case the dropcam. If the owner of this service responds with an unambiguous reply such as "sure," this reply would similarly be sent to the assistant server from the client device, the assistant server would understand this as granting the request, and accordingly authority for the service can be automatically extended to the requesting user, without the need for a separate operation by either user. Similarly, if one of the users in the chat session asks "are you done using the dropcam?" and the user who was granted access replies affirmatively, e.g., "Yes, I am," the assistant server can automatically revoke the access which was shared. Since sharing can be performed automatically based on the content of the messaging session, users do not need to turn away (revert to another form of control) from messaging in order to separately control the system to share access. In this manner, sharing access and control of services become a more seamless part of messaging.

Incorrect granting and revocation can also be addressed by the adaptive learning approach described in the previous section. If the user revokes authority as soon as such authority is granted, for instance, that is an indication to the system that it overstepped in granting that authority.

This approach, of actions taken based on the content of messaging, can be extended to transactions as well. For example, if a first and a second user discuss watching a movie at a particular theatre, and the first user asks the second user "I have found the tickets but can you pay for them?" this question may be sent to the assistant server, which may interpret the question as a request for payment for a specific purpose (payment for tickets in this case). If the second user assents, for example by responding "sure," a selected payment instrument of the second user may be applied to the specific purpose, in this case purchasing the tickets. The assistant server interprets the second user's response as agreement to the request of the first user, and therefore extends authority to the first user for the selected payment instrument for that amount of money and that specific purpose (buying the tickets).

It will be appreciated that the platform and methods described hereinabove may readily be adapted to accommodate additional scenarios for utilizing service modules with messaging applications. For example, utilizing platform 400, users can easily exchange information regarding identical or similar objects that are encoded differently based on different custom protocols. For example, two users in a messaging session may be discussing a third party, e.g., "Bob." To obtain information about Bob, either user may submit a command input, e.g., according to the techniques of FIG. 9, requesting information from any of a plurality of social networks regarding Bob. For example, Bob's name may be provided to assistant interface 412, which encapsulates Bob's information using a "personal profile" type of SIIL message during the messaging session. The personal-profile SIIL message may then be sent as a query to plugins various social networking applications (e.g., Facebook™, LinkedIn™, etc.) via the assistant server. Thereafter, profiles may be received from the social network plugins. Using these techniques, a profile resident on a first social network may also be "forwarded" to a second social network as a query, e.g., by configuring their respective plugins to translate the profiles into SIIL before exchanging profile parameters via assistant server processing block 470. Similar techniques may be applied to retrieve and exchange information relating to any types of content, e.g., movie or sound objects, videos, images, etc.

This use of the messaging content as command inputs may be performed automatically or through conscious user interaction with the assistant server. In the examples given above, the client device may automatically translate perceived commands (e.g., questions and responses from the users) into the semantic information interchange format language and forward the translated commands to the assistant server, which may automatically take the corresponding action. Alternatively, or in addition to such automatic responses, the users may send commands to the assistant server through the medium of the messaging session. In this situation, the assistant server is, in effect, a "participant" in the messaging session in that the assistant server may receive messages (corresponding to commands from users) and also transmit messages (e.g. replies, outputs from services, etc.) within the messaging session. Multiple assistant servers in communication with each other, referred to herein as "multiple instances of the assistant server," may also be participants in a messaging session. In a similar way, services may be "participants" in a messaging session.

Authority trades are also possible, where the system arranges a simultaneous swap of authority over some underlying asset, for example the authority to issue commands to one or more services, permanently or temporarily, based on an agreement between two or more users. These authority swaps can be simple trades between two people, but complex trades can also be arranged between more than two parties. In the same way, a user may permanently transfer the authority over an underlying asset to another user without receiving anything in return, or in exchange for a transfer of payment. Following such a transfer of authority, the original user loses their authority over the underlying asset. In this way, sales or transfers of access or authority can be made in virtual reality. For example, a user selling their home can transfer their authority over the home's thermostat to a buyer. The system can also hold things (e.g., authority to issue commands to one or more services) in escrow to ensure the transaction is completed properly.

Described herein, and in U.S. Pat. No. 9,111,214, is a semantic information interchange format language used at an assistant server to allow communication between services. All command inputs received, as well as outputs from the various services translated through the various plugins, are expressed in the form of the semantic information interchange format language. The semantic information interchange format language can be used to describe anything, for example, to describe command inputs, to describe data received from one plugin, to describe data sent to another plugin, or any communication between two devices and/or services. The semantic information interchange format language also helps transfer information between participants in a messaging session.

Data, expressed in the semantic information interchange format language, may be obtained from different services, and may be shared between people via messaging. This data can also be shared between one or more users and the services themselves, where the services are participants in messaging sessions. A service may be a "participant" in the messaging session in the sense that the service may send and receive data through the medium of a messaging session involving one or more users. Users may message data, expressed in the semantic information interchange format language, to a service as a command to carry out an action, and additionally the service may provide information to a messaging session, also expressed in the semantic information interchange format language, for example in response to a command from one or more users. In both cases, the assistant server is managing the messaging session, as described above, and translates between the custom protocol of the external service and the semantic information interchange format language with the corresponding plugin. One or more services may participate in a messaging session in this fashion. Multiple instances of the assistant server may also participate in a messaging session in this manner.

One or more users in a chat session may also invite a plugin to participate in a chat session, invisibly from the other users in the chat session, based on the users' authority of access to those plugins. Basically, the users may bring one or more plugins into the chat session and make use of these plugins, without extending authority to other participants of the chat session or even allowing other participants in chat session to be aware of the plugins' participation. Plugins in this case may include the users' individual clients for the system. Users may also share their plugins with the other participants in the chat session as needed. This sharing of plugins with other users through a chat session may be selective, i.e., plugins may be shared with all the users in a messaging session or only a subset of the users in a messaging session, as desired by the user owning the plugins.

As an example of services participating in a messaging session, a user could obtain a movie from Rotten Tomatoes™ when Rotten Tomatoes™ sends data about the movie to the messaging session. The user may then message or transmit this data to Netflix™. The Netflix™ plugin may convert the received data into the custom language of Netflix™, and cause the movie to be listed in the user's Netflix™ queue. As another example, a user could message or transmit data corresponding to a ticket that user had purchased, e.g., on Fandango™, to another person. The other person could take this data, expressed in the semantic information interchange format language, and message or transmit the data to a ticket purchase service (for example, Fandango™ or Movietickets.com™) and have a ticket corresponding to the message be purchased, using that user's selected credit card or other payment credential. This situation described above of messaging data representing a purchase to a service to be purchased again by another user and/or another service, possibly with different payment credentials, is an example of a mimicking transaction.

Users can also collaborate to assemble data through messaging. As an example, one user can obtain data expressed in the semantic information interchange format language representing an order for a pizza and message the data to another user, who then adds toppings to the pizza, in effect adding additional information to the data representing the pizza. The data may be messaged between multiple users in this way, each user modifying the data (e.g. by adding or removing toppings) until the users are ready to order. At that point, one of the users may send the data representing the pizza order to a service, for example Pizza Hut™, to carry out the corresponding operation, in this case ordering the pizza. As part of being messaged to Pizza Hut™, the data expressed in the semantic information interchange format language is sent to the assistant server, which in turn sends the data to the Pizza Hut™ plugin to be converted to the Pizza Hut™ custom language, and thereafter sent to Pizza Hut™ to order the pizza. Notably, these operations can occur automatically without direct user interaction. In the users' perception, they messaged between each other regarding what kind of pizza to buy, and then messaged their agreed-upon pizza order to Pizza Hut™.

Similarly, a retailer might message a user an offer, for example an offer to buy a product at a discount. That offer would be expressed in the semantic information interchange format language, which the user may be able to message to another user, and this other user may redeem the offer, possibly according to a relevant context. Whether the offer has been received from another user may be a context which affects the offer, such that the offer changes as it is messaged from one user to another. For example, if the initial offer from the retailer to the first user was to buy a soft drink at 20% off, the same offer, after being messaged to another user, may allow the other user to buy a soft drink at 50% off. Alternatively, the offer, after being messaged to the other user, may allow the other user to buy coffee at 50% off from a coffee outlet owned by the same retailer. In other words, the number of times data has been messaged may also be included in the data to be used as a context to interpret as a command. The transmission of this data (corresponding to the offer) may also be trackable. A user that shares an offer with many of their friends and then redeems the offer might be rewarded with another offer, for example for a free product, based on their friends' sharing and use behavior.

Tracking of the number of times an offer has been messaged between users can also be used to gamify commerce quite extensively. For instance, a user that is successful in referring many friends to a new service might gain an elite status with that service based on the sharing and use behavior of that user's friends. In all of these cases, the same data (the offer) is being translated differently in different contexts, and potentially between different plugins.

This advertising could be more open as well. For example, a retailer might announce that 50 units of an item are available for free. Then one or more users can request and receive data corresponding to the offer from the retailer's plugin (which might be accessible via chat also) if the offer is still available (in this example, if any of the 50 units of the item are still available). The one or more users may be able to then transfer this data (corresponding to the offer along with the authority to redeem the offer as described above) to other users. Receiving and redeeming the offers might require the receiving users to also install or communicate with a plugin that belongs to the issuing retailer or, alternatively, such installation and/or communication might not be required. Messaging according to the present general inventive concept as described herein then becomes a way by which a retailer can reach many potential customers and generate "buzz" by targeting highly influential individuals with transferrable offers.

Figure 10:
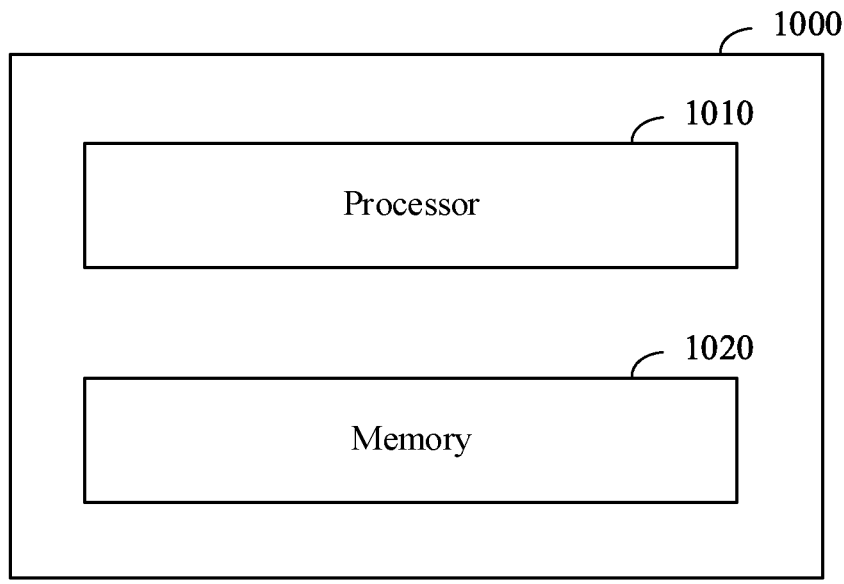
FIG. 10 illustrates an exemplary embodiment of a computing device according to the present disclosure.

FIG. 10 illustrates an exemplary embodiment 1000 of a computing device including a memory 1020 holding instructions executable by a processor 1010 to: transmit to a plugin module a digital command message derived from a messaging application, the digital command message formatted according to a first protocol; and using the plugin module, automate translation between digital command messages formatted according to the first protocol and a custom protocol used by a service module in communication with the plugin module.

Figure 11:
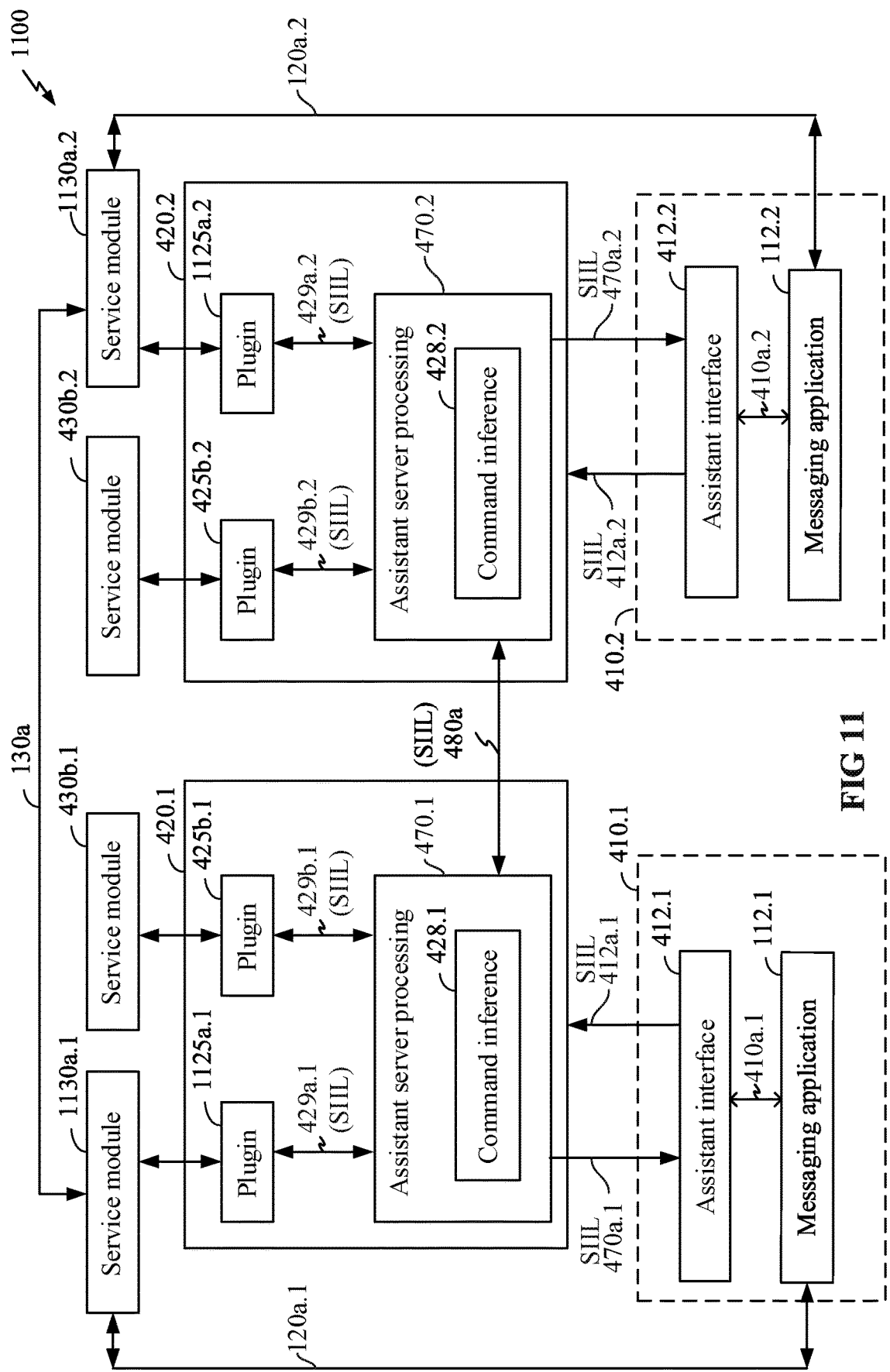
FIG. 11 illustrates an exemplary embodiment wherein the assistant server need not be coupled to a messaging server as one of the service modules.

FIG. 11 illustrates an exemplary embodiment 1100 wherein assistant server 420 need not be coupled to a messaging server as one of the service modules. Note similarly labeled elements in FIGS. 4 and 11 may correspond to elements performing similar functionality, unless otherwise noted. In FIG. 11, assistant server 420 is coupled to service modules 1130a, 430b, none of which are messaging servers, via corresponding plugins 1125a, 425b, respectively.

Exemplary embodiment 110 may be utilized in an implementation wherein any messages sent between messaging applications 112.1 and 112.2 are sent ONLY by the messaging service directly. For example, User A might access his music playlists via his assistant interface and server using his messaging application as the front-end (note that if the provider of the messaging application agrees, 412.1 might simply be bundled into 112.1 and therefore invisible to the user). User A then sends one playlist to User B using the messaging service itself (much like sending a photo today). Embedded in this message will be some information in SIIL. However, User B might simply view this information visually or use it to click to a website and never even use (or indeed even have any access to) any assistant interface at all. Similarly, User A may use their LinkedIn account to find and send the profile of a person (photo, name, position) to User B. User B sees this as a card. However, touching the card simply takes them to the location of this profile in a web-browser. In an alternative exemplary embodiment, User B also sends this to a different user, e.g., User C, who has access (or has opted to have access) to the assistant interface. Now, this might pull up information from User C's LinkedIn account, e.g. how they are connected to this person, their email, the ability to add this person email from their email account, send them a LinkedIn invite, find news about them, etc.

Figure 12:
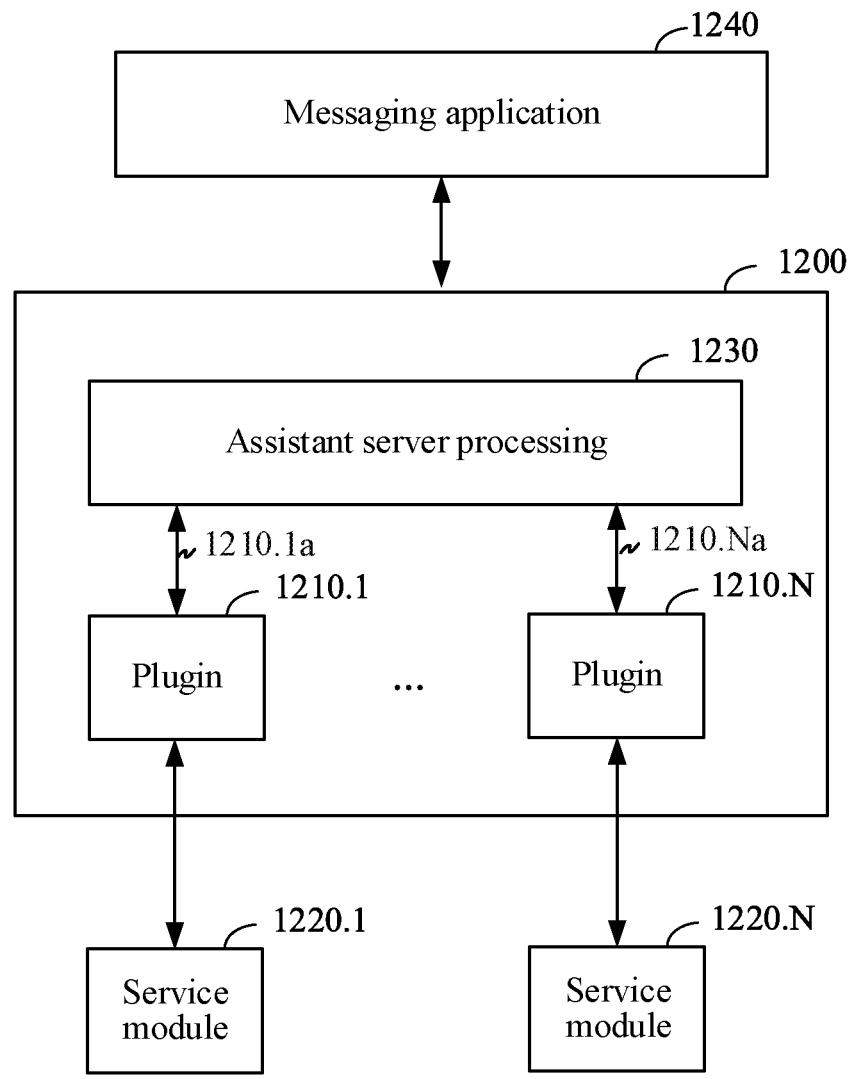
FIG. 12 illustrates an exemplary embodiment of an apparatus according to the present disclosure.

FIG. 12 illustrates an exemplary embodiment of an apparatus 1200 comprising: at least one plugin module 1210 configured to digitally communicate with a respective service module 1220 according to a custom protocol; and an assistant server processing block 1230 configured to transmit to the at least one plugin module 1210 a digital command message 1210a derived from a messaging application 1240, the digital command message 1210a formatted according to a first protocol; wherein the at least one plugin module 1210 is further configured to automate translation between digital messages formatted according to the first protocol and digital messages formatted according to the custom protocol.

Figure 13:
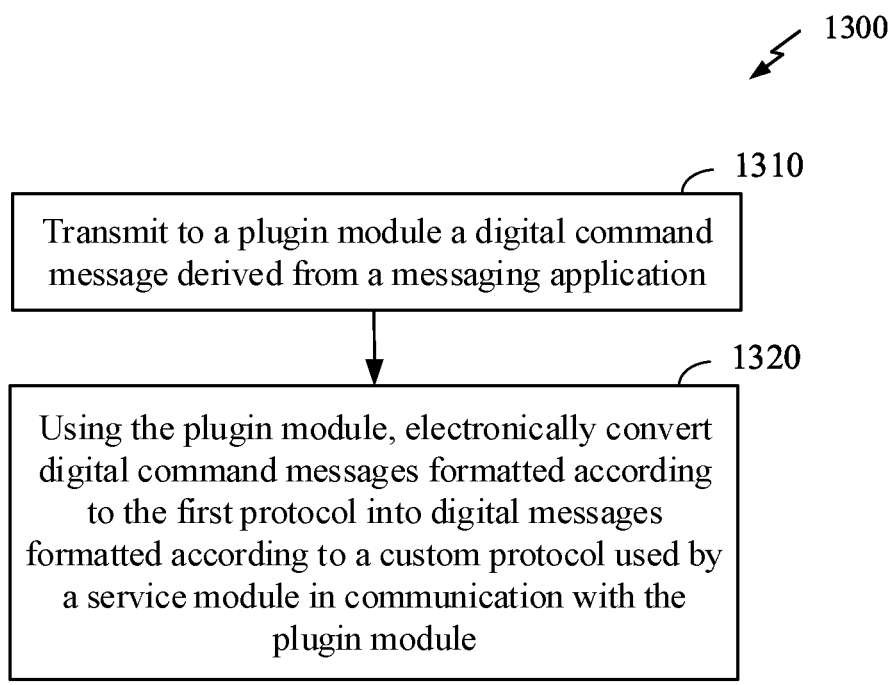
FIG. 13 illustrates an exemplary embodiment of a method for implementing an electronic server for processing requests and commands in a unified digital messaging platform, according to the present disclosure.

FIG. 13 illustrates an exemplary embodiment 1300 of a method for implementing an electronic server for processing requests and commands in a unified digital messaging platform, according to the present disclosure. In FIG. 13, at block 1310, a digital command message derived from a messaging application is transmitted to a plugin module. The command message is formatted according to a first protocol. At block 1320, using the plugin module, digital command messages formatted according to the first protocol are electronically converted into digital messages formatted according to a custom protocol used by a service module in communication with the plugin module.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. An apparatus comprising:
    at least one processor; and
    a memory storing instructions for causing the at least one processor to implement:
    at least one plugin module configured to digitally communicate with a respective service module according to a custom service protocol; and
    an assistant server processing block configured to transmit to the at least one plugin module a digital command message derived from a messaging application, the messaging application in application-to-server communication with a messaging server for transmitting user messages received by the messaging application to other users, said application-to-server communication conducted according to a custom messaging protocol, the digital command message formatted according to a universal semantic information interchange language (SIIL) distinct from the custom messaging protocol and the SIIL being usable by two or more independent plugin modules associated with different entities providing different services;
    wherein the at least one plugin module is further configured to automate translation between digital messages formatted according to the SIIL and digital messages formatted according to the custom service protocol and generate the command based, at least in part, on the at least two different user-initiated types of inputs.

2. The apparatus of claim 1, the assistant server processing block further comprising a command inference block configured to generate the digital command message derived from the message application by:
    receiving an input message corresponding to an input of a user to the messaging application;
    receiving a context of the input message;
    retrieving a proposed command from a library based on the input message and the context; and
    encapsulating the proposed command in the command message.

3. The apparatus of claim 2, the command inference block further configured to generate the command message derived from the message application by:
    receiving a plurality of input messages corresponding to input from a plurality of users of the messaging application, the plurality of users engaged in a single messaging session;
    processing the plurality of input messages and received context to generate the proposed command.

4. The apparatus of claim 2, the command inference block further configured to modify the proposed command based on a correction entered by the user or another user.

5. The apparatus of claim 1, wherein the different user-initiated types of inputs comprise text entered by a user and a gesture captured of the user.

6. The apparatus of claim 1, the assistant server processing block further comprising a command inference block configured to generate the command message derived from the message application by:
    receiving an input message corresponding to an input of a user to the messaging application;
    receiving a context of the input message;
    processing the input message and received context to generate an actual command according to adaptive learning techniques; and
    encapsulating the actual command in the command message.

7. The apparatus of claim 6, the received context of the input message comprising at least one of:
    the user's geographic location when entering the input message, the identity of other users in a messaging session in which the input message is entered by the user, and a time of day when the input message is entered.

8. The apparatus of claim 1, the command message derived from the messaging application corresponding to a user-input message formatted according to the first protocol received from an assistant interface.

9. The apparatus of claim 8, the assistant interface corresponding to a module implemented on a client device in communication with the assistant server over a network communication channel.

10. The apparatus of claim 8, the assistant interface performing translation between the first protocol and a custom protocol of the messaging application.

11. The apparatus of claim 1, the assistant server processing block comprising a first assistant server block configured to communicate with a second assistant server processing block, wherein the second assistant server processing block is configured to transmit to a secondary plugin module a second command message derived from a second messaging application, the second command message formatted according to the first protocol.

12. The apparatus of claim 11, the command message derived from the messaging application comprising a command message to extend authority to a user of the second messaging application to access services provided by the respective service module.

13. A method for implementing an electronic server for processing requests and commands in a unified digital messaging platform, the method comprising:
    transmitting to a plugin module a digital command message derived from a messaging application, the messaging application in application-to-server communication with a messaging server for transmitting user messages received by the messaging application to other users, said application-to-server communication conducted according to a custom messaging protocol, the command message formatted according to a universal semantic information interchange language (SIIL) distinct from the custom messaging protocol and the SIIL being usable by two or more independent plugin modules associated with different entities providing different services, and using the plugin module, electronically converting digital command messages formatted according to the SIIL into digital messages formatted according to a custom service protocol used by a service module in communication with the plugin module and generate the command based, at least in part, on the at least two different user-initiated types of inputs.

14. The method of claim 13, further comprising:
receiving an input message corresponding to an input of a user to the messaging application;
receiving a context of the input message;
retrieving a proposed command from a library based on the input message and the context; and
encapsulating the proposed command according to the first protocol to generate the command message.

15. The method of claim 13, wherein the at least two different user-initiated types of inputs comprise a gesture of the user and text entered by the user.

16. The method of claim 13, wherein the at least two different user-initiated types of inputs comprise at least one digital object.

17. The method of claim 13, the plugin comprising an interface to an online purchasing platform, the command message comprising a command to purchase an item on the online purchasing platform on behalf of a user of the messaging application.

18. The method of claim 13, further comprising:
digitally transmitting to the plugin module at least one other command message derived from other users of the messaging application, the at least one other command message formatted according to the first protocol.

19. The method of claim 13, further comprising generating the command message by, using an assistant interface, translating a user-input message formatted according to a custom protocol of the messaging application into a user-input message formatted according to the first protocol.

20. A computing device including a memory holding instructions executable by a processor to:
transmitting to a plugin module a digital command message derived from a messaging application, the messaging application in application-to-server communication with a messaging server for transmitting user messages received by the messaging application to other users, said application-to-server communication conducted according to a custom messaging protocol, the digital command message formatted according to a semantic information interchange language (SIIL) distinct from the custom messaging protocol and the SIIL being usable by two or more independent plugin modules associated with different entities providing different services; and
using the plugin module, automate translation between digital command messages formatted according to the SIIL and a custom service protocol used by a service module in communication with the plugin module and generate the command based, at least in part, on the at least two different user-initiated types of inputs.

21. The apparatus of claim 1, the assistant server being integrated with the at least one plugin on a single computing device, the single computing device further comprising a module for digitally executing the messaging application.

22. The apparatus of claim 21, wherein the at least two different user-initiated types of inputs comprise a gesture of the user and text entered by the user.

23. The apparatus of claim 22, further configured to allow a first user of the messaging application to extend authority to use the respective service module in digital communication with the at least one plugin module to a second user in communication with the first user via a messaging session of the messaging application.

* * * * *